(12) United States Patent
Åström et al.

(10) Patent No.: US 12,442,933 B2
(45) Date of Patent: Oct. 14, 2025

(54) GNSS DATA IN NON-TERRESTRIAL NETWORK SYSTEM INFORMATION

(71) Applicant: TELEFONAKTIEBOLAGET LM ERICSSON (PUBL), Stockholm (SE)

(72) Inventors: Magnus Åström, Lund (SE); Olof Liberg, Enschede (SE); Sebastian Euler, Storvreta (SE); Jonas Sedin, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 378 days.

(21) Appl. No.: 17/917,775

(22) PCT Filed: Mar. 29, 2021

(86) PCT No.: PCT/IB2021/052588
§ 371 (c)(1),
(2) Date: Oct. 7, 2022

(87) PCT Pub. No.: WO2021/205283
PCT Pub. Date: Oct. 14, 2021

(65) Prior Publication Data
US 2023/0134701 A1    May 4, 2023

Related U.S. Application Data

(60) Provisional application No. 63/007,808, filed on Apr. 9, 2020.

(51) Int. Cl.
*G01S 19/25* (2010.01)
*G01S 19/28* (2010.01)

(52) U.S. Cl.
CPC ............ *G01S 19/254* (2013.01); *G01S 19/28* (2013.01)

(58) Field of Classification Search
CPC combination set(s) only.
See application file for complete search history.

(56) References Cited

U.S. PATENT DOCUMENTS

| | | | |
|---|---|---|---|
| 5,841,396 | A | 11/1998 | Krasner |
| 6,307,503 | B1 | 10/2001 | Liu |

(Continued)

FOREIGN PATENT DOCUMENTS

| | | | |
|---|---|---|---|
| CN | 101268631 A | | 9/2008 |
| JP | 2015021900 A | | 2/2015 |
| JP | 2020504820 A | | 2/2020 |

OTHER PUBLICATIONS

3GPP, "3rd Generation Partnership Project; Technical Specification Group Radio Access Network; Solutions for NR to support non-terrestrial networks (NTN) (Release 16)", TR 38.821 V16.0.0, Dec. 2019.

(Continued)

*Primary Examiner* — Vladimir Magloire
*Assistant Examiner* — Eric K Hodac
(74) *Attorney, Agent, or Firm* — ERICSSON INC.

(57) ABSTRACT

According to certain embodiments, a method performed by a wireless device comprises receiving Assisted-Global Navigation Satellite System (A-GNSS) information in system information broadcast by a network, receiving signals from a set of GNSS satellites (the set of GNSS satellites comprises at least three GNSS satellites), and determining a location of the wireless device using the A-GNSS information and information received in the signals from the set of GNSS satellites. The method further comprises determining Doppler time and frequency offsets compared to a network satellite. The Doppler time and frequency offsets are determined based on the location of the wireless device. The method further comprises initiating a connection process with the network satellite by transmitting a random access (Continued)

signal with pre-compensated time and frequency, the pre-compensated time and frequency based on the determined Doppler time and frequency offsets.

14 Claims, 14 Drawing Sheets

(56) References Cited

U.S. PATENT DOCUMENTS

| | | | | |
|---|---|---|---|---|
| 9,807,668 | B2* | 10/2017 | Teyeb | H04W 36/34 |
| 2011/0032146 | A1 | 2/2011 | Halivaara et al. | |
| 2012/0116677 | A1* | 5/2012 | Higgison | G01S 5/0072 |
| | | | | 701/518 |
| 2014/0347214 | A1* | 11/2014 | Malkos | G01S 19/05 |
| | | | | 342/357.22 |
| 2016/0294462 | A1 | 10/2016 | Jeong et al. | |
| 2018/0302148 | A1* | 10/2018 | Goetzelmann | G01S 19/02 |
| 2020/0053690 | A1 | 2/2020 | Fischer et al. | |
| 2021/0109229 | A1* | 4/2021 | Söderholm | G01S 19/51 |
| 2023/0012038 | A1* | 1/2023 | Iyer | H02J 13/00002 |
| 2023/0116580 | A1* | 4/2023 | Cheng | H04W 56/0035 |
| | | | | 370/329 |

OTHER PUBLICATIONS

3GPP, "3rd Generation Partnership Project; Technical Specification Group Radio Access Network; Study on New Radio (NR) to support non terrestrial networks (Release 15)", TR 38.811 V1.0.0, Jun. 2018.

LTE; Evolved Universal Terrestrial Radio Access Network (E-UTRAN); Stage 2 functional specification of User Equipment (UE) positioning in E-UTRAN (3GPP TS 36.305 version 15.1.0 Release 15), ETSI TS 136 305 V15.1.0, Oct. 2018.

Mediatek Inc., "New Study WID on NB-IoT/eTMC support for NTN", 3GPP TSG RAN Meeting #86, RP-193235, Dec. 9-31, 2019, Sitges, Spain.

Thales, "Solutions for NR to support non-terrestrial networks (NTN)", TSG RAN meeting #86, RP-193234, Dec. 9-13, 2019, Sitges, Spain.

CATT, CAICT, "PRACH design and timing advance", R1-1908591, 3GPP TSG RAN WG1 Meeting #98, Prague, CZ, Aug. 26-30, 2019.

Nokia, Nokia Shanghai Bell, "UE Positioning in NTN", R1-1904665, 3GPP TSG RAN WG1 Meeting #96bis, Xi'an, China, Apr. 8-12, 2019.

Yanhua, X., "Doppler Shift Calculation and Compensation Study in Mobile Satellite Communication System", Master's Degree Dissertation, https://www.cnki.net, 2013.5.29, 61 Pages, English Abstract.

* cited by examiner

GNSS DATA IN NON-TERRESTRIAL NETWORK SYSTEM INFORMATION

PRIORITY CLAIM

This application is a national stage of International Application No. PCT/IB2021/052588, filed Mar. 29, 2021, which claims the benefit of U.S. Provisional Application No. 63/007,808, filed on Apr. 9, 2020, the disclosures of which are all hereby incorporated by reference.

TECHNICAL FIELD

Certain embodiments of the present disclosure relate, in general, to wireless communications and, more particularly, to providing Global Navigation Satellite System (GNSS) data in Non-Terrestrial Network (NTN) system information.

BACKGROUND

Third Generation Partnership Project (3GPP) Release 8 specifies the Evolved Packet System (EPS). EPS is based on the Long-Term Evolution (LTE) radio network and the Evolved Packet Core (EPC). It was originally intended to provide voice and mobile broadband (MBB) services but has continuously evolved to broaden its functionality. Since Release 13, Narrowband Internet-of-Things (NB-IoT) and LTE for Machine-Type Communication (MTC) (LTE-M) are part of the LTE specifications and provide connectivity to massive MTC (mMTC) services.

3GPP Release 15 specifies the first release of the Fifth Generation (5G) System (5GS). This new generation radio access technology intends to serve use cases such as enhanced mobile broadband (eMBB), ultra-reliable and low latency communication (URLLC), and mMTC. 5G includes the New Radio (NR) access stratum interface and the 5G Core Network (5GC). The NR physical and higher layers reuse parts of the LTE specification and add components when motivated by the new use cases. As an example, NR introduces a sophisticated framework for beam forming and beam management to extend the support of the 3GPP technologies to a frequency range going beyond 6 GHz. In Release 15, 3GPP also started the work to prepare NR for operation in a Non-Terrestrial Network (NTN). The work was performed within the study item "NR to support Non-Terrestrial Networks" and resulted in Technical Report (TR) 38.811.

3GPP Release 16 continued the work of preparing NR for operation in an NTN network with TR 38.821, "Solutions for NR to support Non-Terrestrial Network." In parallel, growing interest to adapt NB-IoT and LTE-M for operation in NTN has resulted in 3GPP Release 17 containing both a work item on NR NTN (RP-193234, Solutions for NR to support non-terrestrial networks (NTN), 3GPP RAN #86) and a study item on NB-IoT and LTE-M support for NTN (RP-193235, Study on NB-IoT/eMTC support for Non-Terrestrial Network, 3GPP RAN #86).

Non-Terrestrial Network

FIG. 1 illustrates an example of a satellite radio access network. A satellite radio access network is one type of NTN, and it usually includes the following components:
   Satellite: a space-borne platform, such as satellite 102.
   Earth-based gateway 103: connects the satellite 102 to a base station (such as base station 160) or a core network, depending on the choice of architecture.
   Feeder link: link between a gateway 103 and a satellite 102.
   Access link; link between a satellite 102 and a User Equipment (UE) (such as wireless device 110).

Depending on the orbit altitude, a satellite may be categorized as low earth orbit (LEO) (typical heights ranging from 250-1,500 km, with orbital periods ranging from 90-120 minutes), medium earth orbit (MEO) (typical heights ranging from 5,000-25,000 km, with orbital periods ranging from 3-15 hours), or geostationary earth orbit (GEO) (height at about 35,786 km, with an orbital period of 24 hours) satellite.

A communication satellite typically generates several beams over a given area. The footprint of a beam is usually in an elliptic shape, which has traditionally been considered as a cell. The footprint of a beam is also often referred to as a spotbeam. The footprint of a beam may move over the earth surface with the satellite movement or may be earth-fixed with some beam pointing mechanism used by the satellite to compensate for its motion. The size of a spotbeam depends on the system design, which may range from tens of kilometers to a few thousands of kilometers. The example architecture of FIG. 1 shows a satellite network with bent pipe transponders.

Propagation delay is an important aspect of satellite communications that is different from the delay expected in a terrestrial mobile system. Due to the orbit height, the round-trip delay for a bent pipe satellite network may range from tens of ms (in the case of LEO) to several hundreds of ms (for GEO). For comparison, the round-trip delays catered for in a cellular network are limited to 1 ms. Due to the high velocity of the LEO and MEO satellites, the propagation delay may be highly variable and may change on the order of 10-100 µs every second, depending on the orbit altitude and satellite velocity.

A second important aspect, closely related to the timing, is a Doppler frequency offset induced by the motion of the satellite. The access link may be exposed to Doppler shift on the order of 10-100 kHz in sub-6 GHz and proportionally higher in higher frequencies. Also, the Doppler is varying, with a rate of up to several hundred Hz per second in S band and several kHz per second in Ka band.

Global Navigation Satellite System (GNSS)

GNSS is a satellite navigation system with global coverage. GNSS uses satellites for positioning, navigation, and timing. The global coverage for a GNSS system is generally achieved by a constellation of tens of MEO satellites on several orbital planes. Each satellite can broadcast a message that contains the precise transmission time of the message, ephemeris of this satellite, and rough orbital data about all satellites. By receiving GNSS signals from usually at least four different satellites, the receiver can measure the time-of-arrival of the signal from each satellite and determine its location. This also allows the receiver to calculate the current local time to high precision for the purpose of time synchronization.

The time-to-first-fix (TTFF) can take tens of seconds with standalone GNSS due to the long time it takes to obtain orbital information of the satellites at a low data rate (e.g., 50 bps). Assisted-GNSS (A-GNSS) can be used to reduce the TTFF. A-GNSS servers download and store the orbital information from the satellites. A GNSS-capable device can connect to the A-GNSS servers to download the orbital information using a cellular connection. Since the cellular connection can offer much higher data rate than GNSS download speed, downloading orbital data from A-GNSS servers takes less time. 3GPP has defined A-GNSS protocols, see e.g., Section 6.5.2 on A-GNSS positioning in Technical Specification (TS) 36.355 on LTE Positioning Protocol (LPP).

SUMMARY

There currently exist certain challenge(s). For example, in order for a device (UE) to connect to a non-geostationary orbit (NGSO) satellite network, it may be required to compensate for relativity effects in timing and frequency due to the very high satellite velocities. This requires detailed knowledge about the device location, typically obtained from a GNSS system. This may incur a considerable delay, the length of which depends on how recent satellite data the device has access to, during which time the device updates its GNSS satellite data and determines its position. In addition to the incurred delay, for low power devices, receiving continuously over an extended time will drastically reduce device longevity. Hence, there is a need for a method to acquire GNSS information by help of the satellite network such that the device can faster find its location, upon which it can connect to the satellite network. GNSS positioning is also useful for other NTN network typologies, such as geostationary orbit (GSO) satellite networks and high-altitude platform systems (HAPS). For example, GNSS can be used for facilitating mobility. But the long delay associated with GNSS time-to-fix undermines its usefulness, e.g., in Radio Resource Control (RRC) connected mode.

Certain aspects of the present disclosure and their embodiments may provide solutions to these or other challenges. A first example may be a method in a network node to provide relevant Assisted-GNSS (A-GNSS) information in system information (SI) in a compact format such that overall SI size is manageable. This may be achieved by first identifying the area of earth's surface that is presently covered by a specific network satellite and relevant GNSS satellites for positioning within that area. A-GNSS information for the relevant GNSS satellites can then be provided in a system information message that is transmitted by the network satellite. A second example may be a method in a network device to connect to a cellular satellite network. This may be achieved by first receiving a system information message including A-GNSS information and signals from at least three GNSS satellites. Based on the A-GNSS information and the GNSS signals, the location of the device may be determined, and from that, Doppler time and frequency offsets compared to the network satellite can be determined. The Doppler time and frequency offsets towards the network satellite depend in part on the current location of the second network satellite. Thus, in order to determine the Doppler and frequency offsets, the device may first determine the current location of the network satellite. For example, the device may determine the current location of the network satellite from the SI message or from predicting the current location of the network satellite based on knowledge of a previous location of the network satellite (e.g., possibly by using additional data, such as ephemeris data). Determining the Doppler time and frequency offsets compared to the network satellite allows the device to perform a connection to the cellular satellite network by transmitting a random access signal with pre-compensated time and frequency.

There are, proposed herein, various embodiments which address one or more of the issues disclosed herein. Some, but not all, of the embodiments are listed below:

1. A method in a network node for providing GNSS information to UEs connecting to cellular satellite networks, the method comprising:
   a. determining a location of a network satellite related to the network node;
   b. determining a subset of GNSS satellites proxime to the network satellite; and
   c. transmitting a system information message including information related to the proxime GNSS satellites.

2. The method of embodiment 1, where the network node is co-located with the network satellite.

3. The method of embodiment 1, where the network satellite is used as a bent pipe for the network node.

4. The method of any of embodiments 1-3, where the satellite subset is determined such that positioning using said subset is feasible on a ground area that is served or will be served by the network satellite.

5. The method of any of embodiments 1-5, where the GNSS information comprises:
   a. almanac data of the subset of GNSS satellites;
   b. ephemeris data of the subset of GNSS satellites;
   c. timing information; and/or
   d. ionospheric model data.

6. The method of embodiment 5, where said data is further modified to accommodate a lower positioning requirement.

7. The method of embodiment 6, where such modification includes Quantization of data.

8. The method of any of embodiments 1-7, where the system information message further includes a duration of validity for the provided GNSS data.

9. The method of any of embodiments 1-8, where the SI message further includes ephemeris or timing data of the network satellite.

Additionally, certain embodiments provide further details on how to determine which satellites are relevant and/or further details on how GNSS data is obtained.

10. A method in a network device for receiving GNSS information from a cellular satellite network, in order to connect to said satellite network, the method comprising:
   a. receiving a system information message including GNSS information from a first network satellite;
   b. receiving position data from at least one GNSS satellite, for which information is included in the SI message;
   c. determining a location based on the received SI and position data;
   d. determining a Doppler timing and frequency shift towards a second network satellite based on the determined location; and
   e. transmitting an RA to the second network satellite, in order to connect to the satellite network, based on the Doppler shift.

The Doppler time and frequency offsets towards the second network satellite depend in part on the current location of the second network satellite and the velocity of the second network satellite in its current position. Thus, in order for the network device to determine the Doppler and frequency shift in step 10(d) above, the network device may first determine the current location of the second network satellite. For example, the network device may determine the current location of the second network satellite from the SI message or from predicting the current location of the second network satellite based on knowledge of a previous location of the second network satellite (e.g., possibly by using additional data, such as ephemeris data).

11. The method of embodiment 10, where, prior to transmitting the RA, the method comprises determining that the SI information is still valid.

12. The method of embodiment 10, where, prior to receiving the SI message, the method comprises determining that a previous UE location is invalid.

According to certain embodiments, a method performed by a wireless device comprises receiving A-GNSS information in system information broadcast by a network, receiving signals from a set of GNSS satellites (the set of GNSS satellites comprises at least three GNSS satellites), and determining a location of the wireless device using the A-GNSS information and information received in the signals from the set of GNSS satellites. The method further comprises determining Doppler time and frequency offsets compared to a network satellite. The Doppler time and frequency offsets are determined based on the location of the wireless device. The method further comprises initiating a connection process with the network satellite by transmitting a random access signal with pre-compensated time and frequency, the pre-compensated time and frequency based on the determined Doppler time and frequency offsets.

According to certain embodiments, a wireless device comprises processing circuitry and power supply circuitry. The power supply circuitry is configured to supply power to the wireless device. The processing circuitry is configured to receive A-GNSS information in system information broadcast by a network, receive signals from a set of GNSS satellites (the set of GNSS satellites comprises at least three GNSS satellites), and determine a location of the wireless device using the A-GNSS information and information received in the signals from the set of GNSS satellites. The processing circuitry is further configured to determine Doppler time and frequency offsets compared to a network satellite. The Doppler time and frequency offsets are determined based on the location of the wireless device. The processing circuitry is further configured to initiate a connection process with the network satellite by transmitting a random access signal with pre-compensated time and frequency, the pre-compensated time and frequency based on the determined Doppler time and frequency offsets.

In certain embodiments, the above-describe wireless device and/or method in a wireless device may include one or more additional features, such as any one or more of the following:

Certain embodiments determine how long the A-GNSS information is valid and use the A-GNSS information while the A-GNSS information is valid. For example, certain embodiments determine how long the A-GNSS information is valid based on receiving an indication how long the A-GNSS information is valid from the network.

Certain embodiments determine at least one GNSS satellite that is suitable to include in the set of GNSS satellites. As described above, the set of GNSS satellites comprises at least three GNSS satellites from which signals are received (the signals include information that assists in determining the location of the wireless device). In certain embodiments, determining the at least one GNSS satellite that is suitable to include in the set of GNSS satellites is based on an ability to use the at least one GNSS satellite for positioning within a present coverage area or a future coverage area of the network satellite. In certain embodiments, determining the at least one GNSS satellite that is suitable to include in the set of GNSS satellites is based on GNSS satellite data associated with the at least one GNSS satellite. The GNSS satellite data can be received from the GNSS or another network node.

Certain embodiments estimate a location or coverage area of the network satellite based on past location data associated with the network satellite, the past location data received from the network satellite or another network node.

Certain embodiments estimate a location or coverage area of the network satellite based on location data associated with the network satellite, the location data determined from orbital elements publicly available as a two-line element set (TLE).

Certain embodiments require the wireless device to read the A-GNSS information on initial attach.

Certain embodiments require the wireless device to read the A-GNSS information in response to a radio link failure or in response to a problem completing random access.

In certain embodiments, the A-GNSS information comprises one or more of the following: almanac data for the set of GNSS satellites; ephemeris data for the set of GNSS satellites; timing information; and/or ionospheric data that accounts for ionospheric propagation effects.

According to certain embodiments, a method performed by a network node comprises determining a location or coverage area of a network satellite. The location or coverage area corresponds to a present location or coverage area or a future location or coverage area of the network satellite. The method further comprises identifying at least one GNSS satellite suitable for providing location information relevant to the location or coverage area of the network satellite, determining A-GNSS information associated with the at least one GNSS satellite, and transmitting system information comprising the A-GNSS information to a wireless device.

According to certain embodiments, a network node comprises processing circuitry and power supply circuitry. The power supply circuitry is configured to supply power to the network node. The processing circuitry is configured to determine a location or coverage area of a network satellite. The location or coverage area corresponds to a present location or coverage area or a future location or coverage area of the network satellite. The processing circuitry is further configured to identify at least one GNSS satellite suitable for providing location information relevant to the location or coverage area of the network satellite, determine A-GNSS information associated with the at least one GNSS satellite, and transmit system information comprising the A-GNSS information to a wireless device.

In certain embodiments, the above-describe network node and/or method in a network node may include one or more additional features, such as any one or more of the following:

Certain embodiments determine how long the A-GNSS information is valid and indicate how long the A-GNSS information is valid to the wireless device. For example, in certain embodiments, how long the A-GNSS information is valid is based on how long until the wireless device needs to reacquire or update the A-GNSS information.

Certain embodiments identify the at least one GNSS satellite based on GNSS satellite data associated with the at least one GNSS satellite, wherein the GNSS satellite data is received from the GNSS or another network node. In certain embodiments, the GNSS satellite data comprises past GNSS satellite data used to predict a present or future location of the at least one GNSS satellite.

To determine the location or coverage area of the network satellite, certain embodiments estimate the location or coverage area of the network satellite based on past location data associated with the network satellite. The past location data may be obtained from the network satellite or another network node.

To determine the location or coverage area of the network satellite, certain embodiments estimate the location or coverage area of the network satellite based on location data associated with the network satellite. The location data determined from orbital elements publicly available as a TLE.

In certain embodiments, the system information indicates whether the wireless device is required to read the A-GNSS information on initial attach.

In certain embodiments, the wireless device is required to read the A-GNSS information in response to a radio link failure or in response to a problem completing random access.

In certain embodiments, the A-GNSS information comprises one or more of the following: almanac data for the set of GNSS satellites; ephemeris data for the set of GNSS satellites; timing information; and/or ionospheric data that accounts for ionospheric propagation effects.

In certain embodiments, the network node is part of the network satellite. In other embodiments, the network node is located on the ground and is connected to the network satellite.

Certain embodiments process the A-GNSS information before transmission in order to reduce a total amount of transmitted data.

Certain embodiments may provide one or more of the following technical advantage(s). For example, some embodiments may allow for efficient use of GNSS information in a cellular network, for example, to enable fast connections to the cellular satellite network, thereby significantly reducing both connection latency and device power consumption.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Cellular Satellite Network Provision of Assisted-GNSS Information

In some embodiments, a method in a network node provides relevant Assisted-GNSS (A-GNSS) information in system information in a compact format such that overall SI size is manageable. This is achieved in some instances by first identifying the area of earth's surface that is presently covered (may be anywhere from a few square kms to 1000+ square kms) by a specific network satellite and relevant GNSS satellites for positioning within that area. A-GNSS information for the relevant GNSS satellites is then provided in a system information message that is transmitted by the network satellite. There are two types of satellite systems, regenerative payload systems and transparent payload systems. For regenerative payload systems, the base station (network node) may be located in the satellite. For transparent payload systems, the base station is on the ground and the satellite is merely a (complex) repeater. Transparent payload systems can also be referred to as "bent-pipe."

Figure 1:
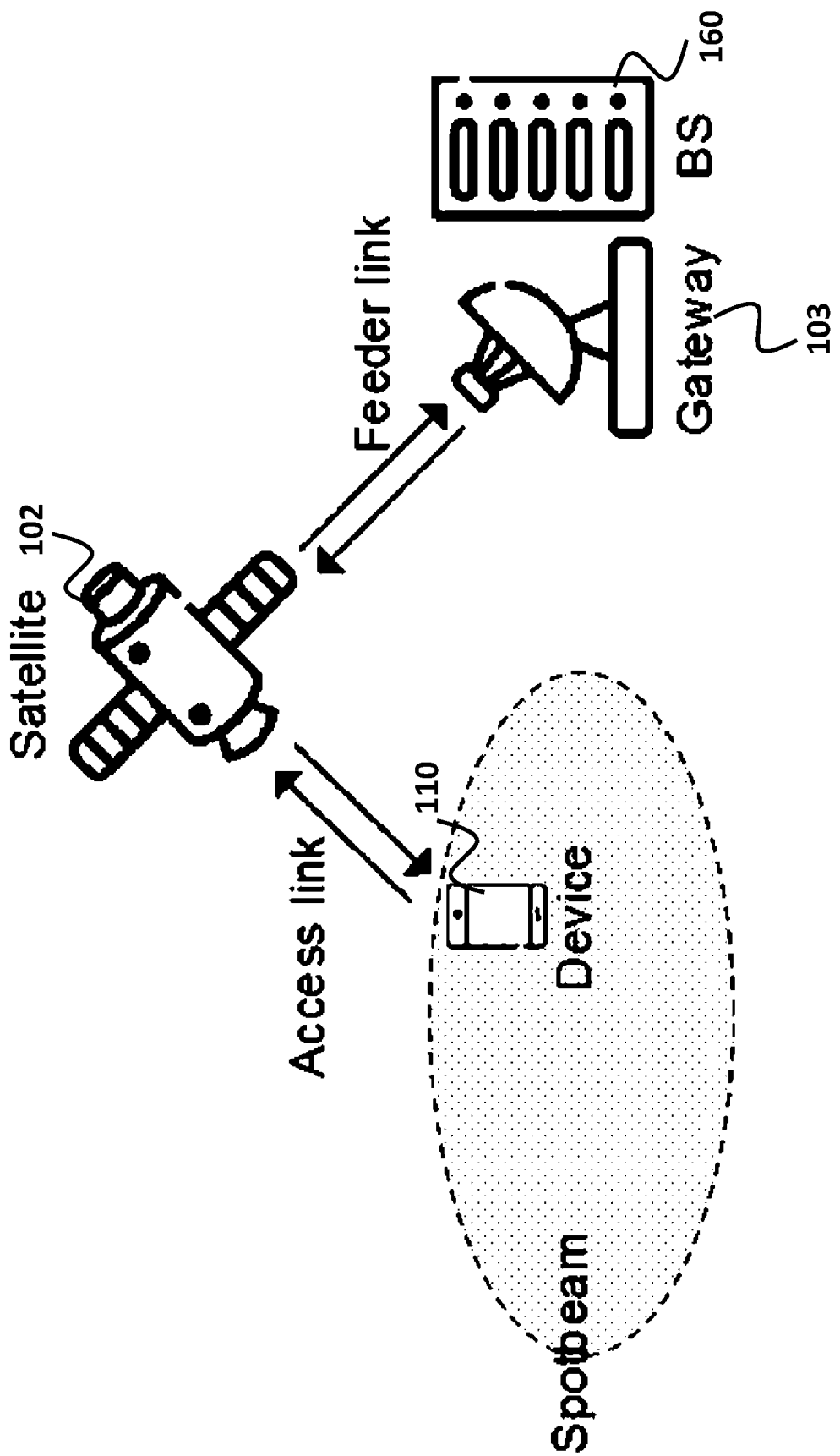
FIG. 1 illustrates an example of a satellite radio access network in accordance with certain embodiments.
Figure 2:
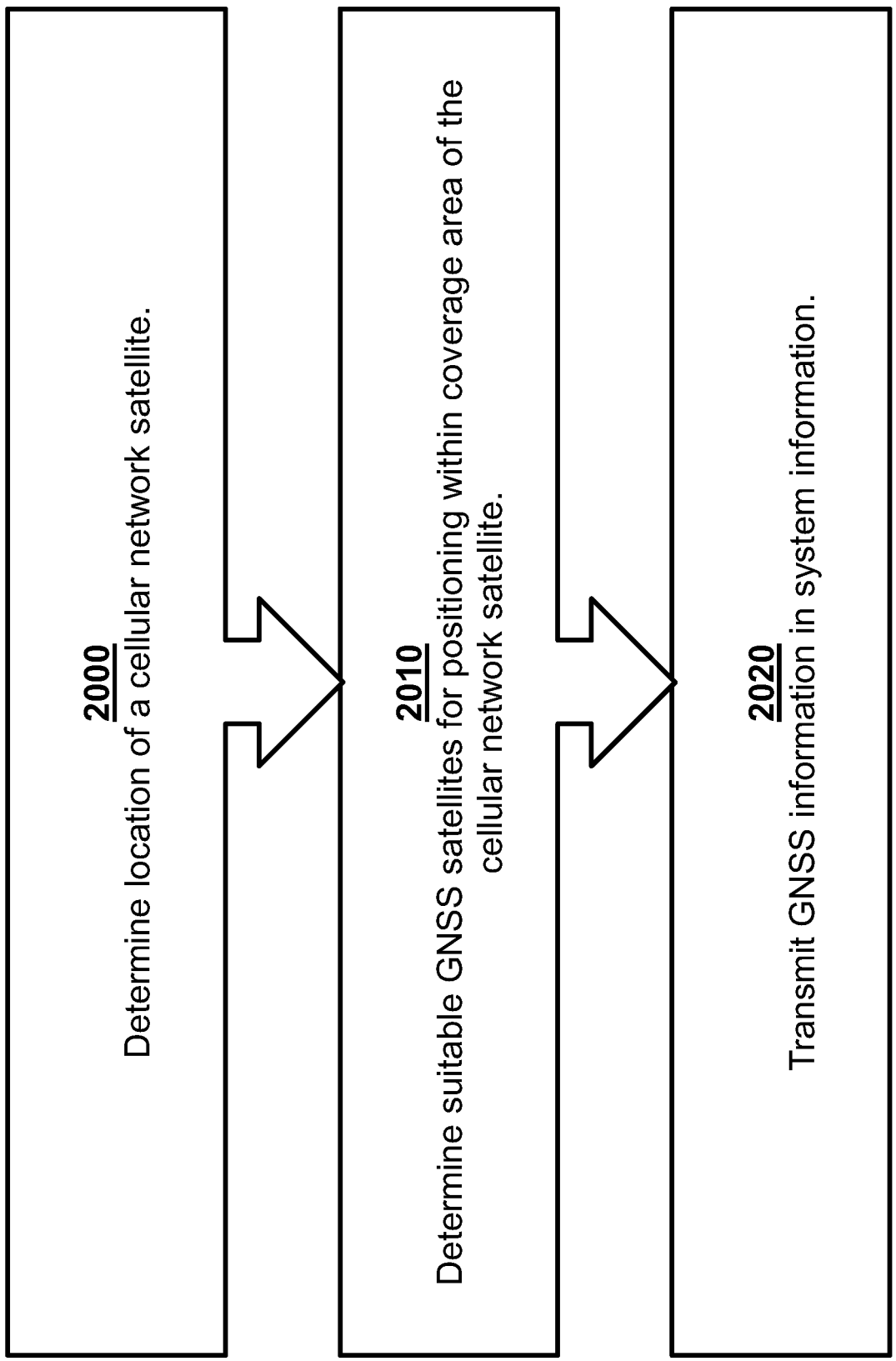
FIG. 2 illustrates an example of a method performed by a network node in accordance with some embodiments.

In some embodiments, a method in a network node for providing A-GNSS information to devices that need to connect to the cellular satellite network. FIG. 2 illustrates an example. In step 2000, the network node determines the location of a cellular network satellite. This is done, for example, by receiving satellite location data from another network node or by retrieving such data directly from the satellite and may also include using a past location to estimate the present or a future location. The position may also be determined from orbital elements publicly available as a two-line element set (TLE). TLE is a data format encoding a list of orbital elements of an Earth-orbiting object for a given point in time, the epoch. Using suitable prediction formula, the state (position and velocity) at any point in the past or future can be estimated to some accuracy. In step 2010, the network node determines which GNSS satellites may be used for positioning within the area on earth's surface that is covered by the cellular network satellite. This step may be performed by receiving such GNSS satellite data from another network node or from the GNSS satellite system itself. Here too, the determination may involve a step of using a past satellite location in order to predict the present or a future satellite location, or it may be based on publicly available TLE. In step 2020, the network transmits a system information message including A-GNSS information that is related to the GNSS satellite subset that is determined to be useful within the present or future coverage area of the cellular network satellite.

The network node may be a part of the cellular network satellite, or, alternatively, the network node may be located on the ground, using the satellite for a bent pipe connection towards a coverage area and/or one or more devices. The GNSS satellite subset may be determined such that they may be used for positioning within a coverage area of the cellular network satellite. Alternatively, the subset may be determined such that it may be used for positioning within a future coverage area of the cellular network satellite. The A-GNSS information may include, by way of example and not limitation, (a) Almanac data for the subset of GNSS satellites; (b) Ephemeris data for the subset of GNSS satellites; (c) Timing information; (d) Ionospheric data, to account for ionospheric propagation effects; and/or (e) any other relevant A-GNSS data. The A-GNSS data may further be processed, e.g., quantized, truncated or otherwise compressed in order to reduce the total transmitted amount of data. This may be acceptable since the device accuracy requirement for connecting to a satellite network is lower than typical positioning requirements.

In addition to the A-GNSS information, there may also be corresponding information about the cellular network satellite. There may furthermore be included a validity duration, stating for how long the information is valid. The limited validity may be due to satellite trajectory inaccuracies, or that the subset of GNSS satellites is no longer suitable for positioning within the coverage area of the cellular network satellite. This validity timer can also indicate for how long a time the A-GNSS information would be valid to the UE, i.e., before the UE would need to reacquire/update the A-GNSS information. This may be beneficial in the regions where the (moving) satellite needs to update the A-GNSS information and certain UEs might need to continuously update the A-GNSS information, thus consuming power.

In some embodiments, the UE is only required to read the A-GNSS information on initial network attach. In another embodiment the A-GNSS information is only reacquired if problems occur such as unable to complete random access, radio link failures, or the UE receiving UE-specific A-GNSS information. This may help to reduce power consumption and usage of GNSS measurements only for more specific scenarios.

Determination of GNSS Satellites to Include in A-GNSS Information

Figure 3:
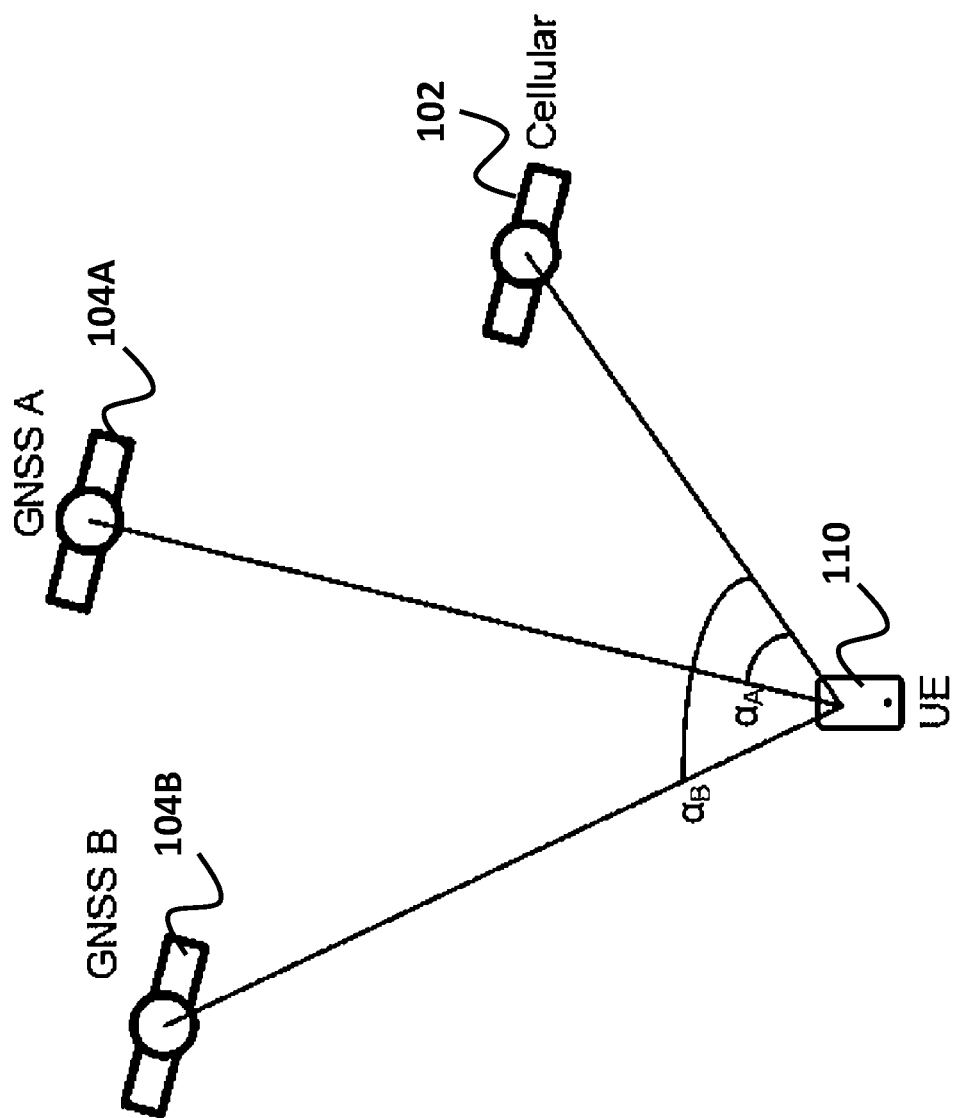
FIG. 3 illustrates an example of GNSS satellite selection based on angular separation in accordance with some embodiments.

Step 2010 in FIG. 2 is for determining the minimum number (N) of GNSS satellites in a set of GNSS satellites to include in the cellular NTN broadcasted system information. Note that N may be as low as 3 but should preferably be at least 4. In some embodiments, the NTN node (i.e., satellite or High Altitude Platform System (HAPS)) selects the mentioned N GNSS satellites based on the angular distance, or separation, between the device to NTN node line-of-sight direction, and the device to GNSS satellite line-of-sight direction. FIG. 3 illustrates this embodiment using $\alpha_A$ and $\alpha_B$ to denote the mentioned angular distance between a cellular NTN node 102 and GNSS satellites 104A and 104B, respectively. In this example the cellular NTN node 102 would select GNSS satellite 104A over GNSS satellite 104B to minimize the angular separation as this may minimize the time required for the UE to retune its receiver beam towards the GNSS satellites. Note here that many satellite devices make use of electronically steerable parabolic antenna receivers of high gain. As the antenna can be used for both cellular communication and GNSS reception, it is of relevance to minimize the time required to receive the GNSS signal, as this will maximize the time the antenna can be used for cellular system operation. This motivates to prioritize the broadcast of GNSS satellites minimizing mentioned angular separation.

In some embodiments the set of N GNSS satellites are selected to maximize the spread in the mentioned angular separation across the N selected GNSS satellites (within the bounds of permitted angular separation). Certain embodiments may have a maximum permitted angular separation in order to limit the UE scanning range for GNSS satellites. Certain embodiments may have a minimum permitted angular separation to improve positioning accuracy (the angular separation should be above a minimum, for example, because N satellites in almost identical positions would not provide robust positioning information). Certain embodiments optimize the angular separation across the N selected GNSS satellites in order to limit the UE scanning range for the GNSS satellites while optimizing the positioning accuracy given the limited scanning range.

Device Connection to a Cellular Satellite Network by Network Provided A-GNSS Information In some embodiments a method performed in a network device may be used to connect the network device to a cellular satellite network. This may be achieved by the network device first receiving a system information message including A-GNSS information and signals from a subset of GNSS satellites including at least three GNSS satellites. Based on the A-GNSS information and the GNSS signals, the location of the device may be determined, and from that, Doppler time and frequency offsets compared to the network satellite can be determined. This allows the device to perform a connection to the cellular satellite network by transmitting a random access signal with pre-compensated time and frequency.

Figure 4:
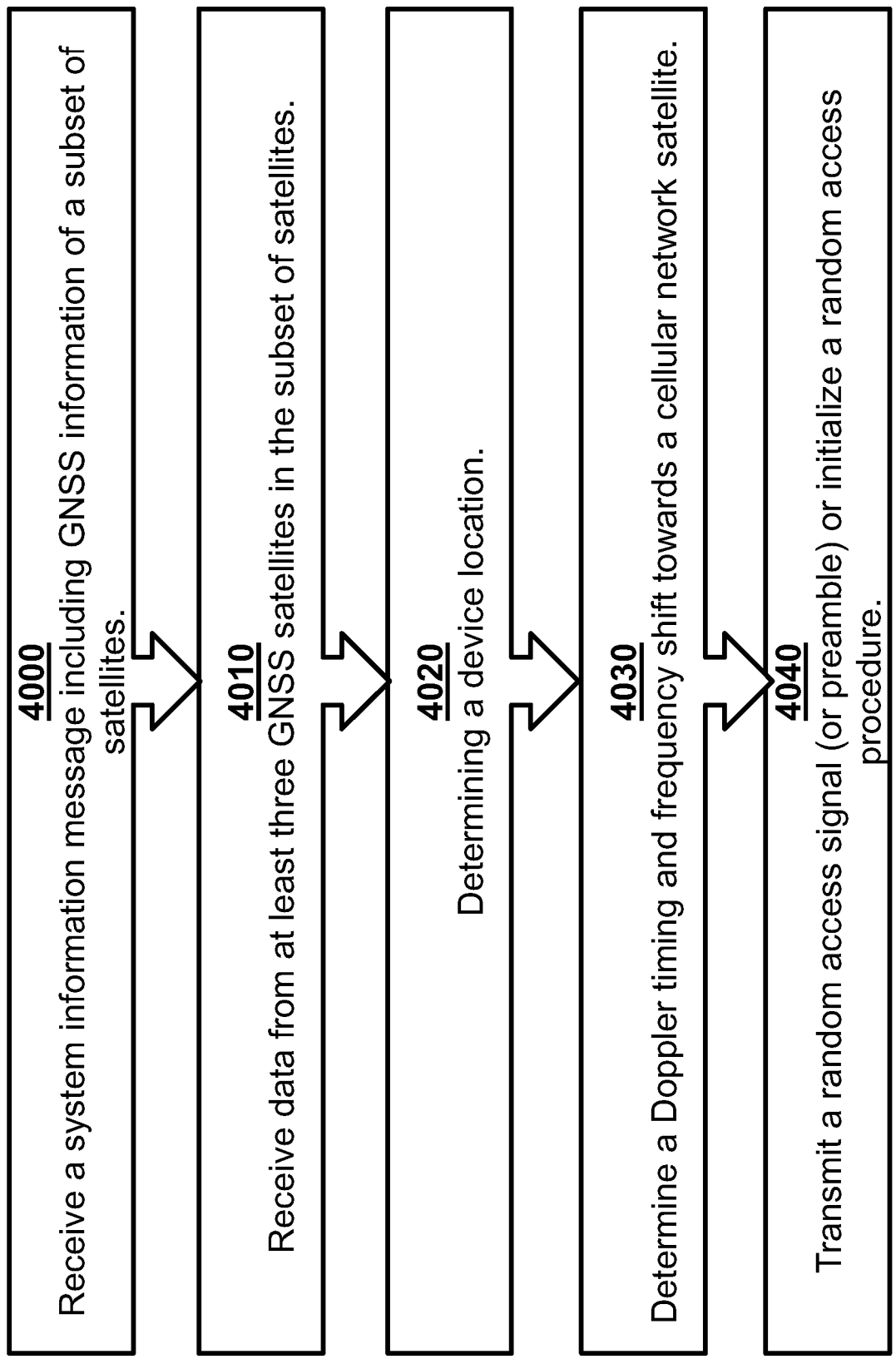
FIG. 4 illustrates an example of a method in a network device in accordance with some embodiments.

Some embodiments comprise a method in a network device for receiving A-GNSS information in order to connect to a cellular satellite network. This can be seen, for example, in FIG. 4. In step 4000, the device receives a system information message from a first cellular network satellite. The SI message includes A-GNSS information about a suitable subset of GNSS satellites for positioning of the network device. In step 4010, the device receives GNSS data from at least three of the satellites in the suitable subset of GNSS satellites. Together with the A-GNSS information, the received GNSS data is used to determine the position of the device at step 4020. At step 4030, the network device may, using the determined position, compute Doppler time and frequency offsets due to the velocity of the cellular network satellite in its current position. Since Doppler effects are based on the present location of the cellular network satellite, its location must also be known. Its location may be determined either from the SI message, or from predicting the present satellite location from an old satellite location, possibly by using additional data, e.g., ephemeris data. Having determined the Doppler shift, the network device may transmit a random access signal (or preamble) or initialize a random access procedure (step 4040). The random access signal/preamble/procedure may be used to facilitate a connection with the cellular network satellite.

Some embodiments may include an additional step wherein prior to attempting to receive the GNSS data, the device may first determine that the GNSS satellite information is still valid, and only perform the transmission at step 4040 if that is the case. If the data is invalid, the network device may still try to acquire its position, and if successful continue with the random access.

In some embodiments, prior to receiving the SI data at step 4010, the network device may determine whether a previous position has become invalid. This may be done, e.g., by determining whether a timer has exceeded a threshold or by determining whether sensors (e.g., magnetic sensors) indicate movement of the network device. Such a timer threshold may further be set according to a mobility class such that a lower mobility class, implying a more stationary UE, will have a higher threshold than a UE with a higher mobility class, implying a more mobile UE.

Although it may be possible to connect to a cellular satellite network without the proposed embodiments, such solutions increase complexity dramatically, since the receiver would need to perform a huge number of time and frequency hypotheses, in practice making it impossible, or the network would need to estimate the needed time and frequency compensation and convey the information back to the UE for correction.

Figure 5:
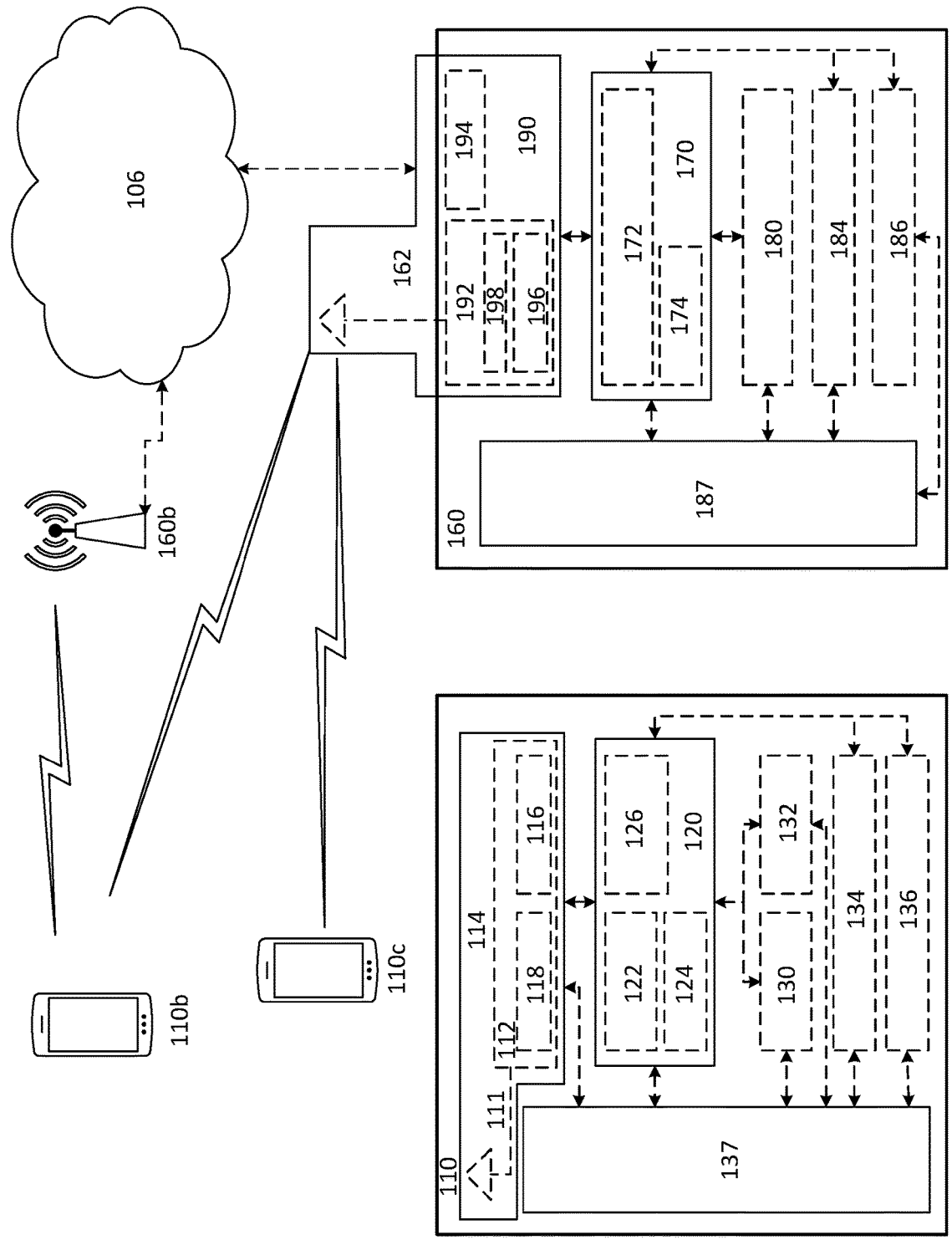
FIG. 5 illustrates an example of a wireless network in accordance with some embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., Mobile Switching Centers (MSCs), Mobility Management Entities (MMEs)), Operation and Maintenance (O&M) nodes, Operations Support System (OSS) nodes, Self-Optimized Network (SON) nodes, positioning nodes (e.g., Evolved-Serving Mobile Location Centres (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, Global System for Mobile communication (GSM), Wide Code Division Multiplexing Access (WCDMA), LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units.

In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band Internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110 as a whole, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into WD 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network, and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry. Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Figure 6:
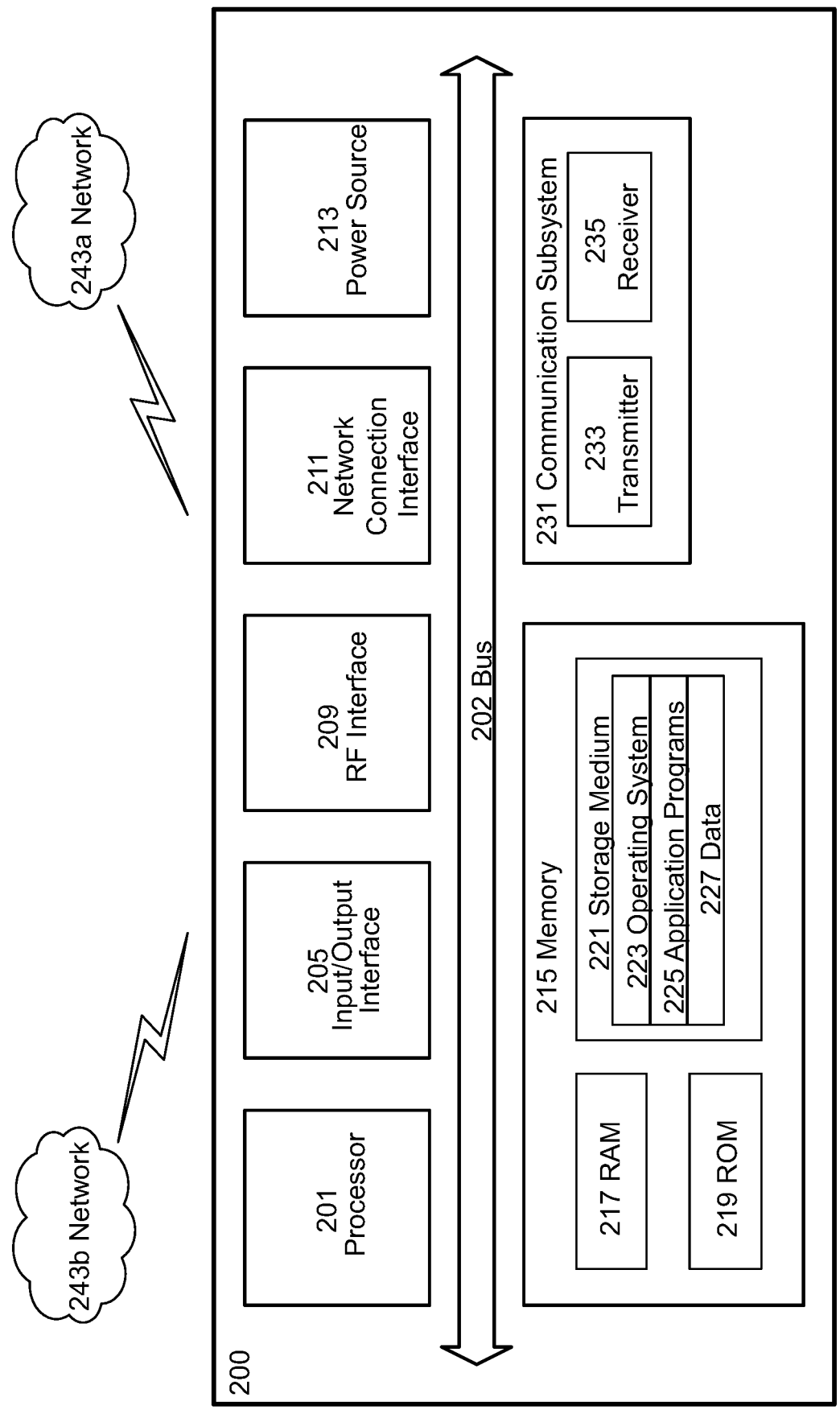
FIG. 6 illustrates an example of a User Equipment in accordance with some embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 6 is a UE, the components discussed herein are equally applicable to a WD, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, field programmable gate array (FPGA), application-specific integrated circuit (ASIC), etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, Universal Terrestrial Radio Access Network (UTRAN), WiMax, or the like. Each transceiver may include transmitter 233 and/or receiver 235 to implement transmitter or receiver functionality, respectively, appropriate to the Radio Access Network (RAN) links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
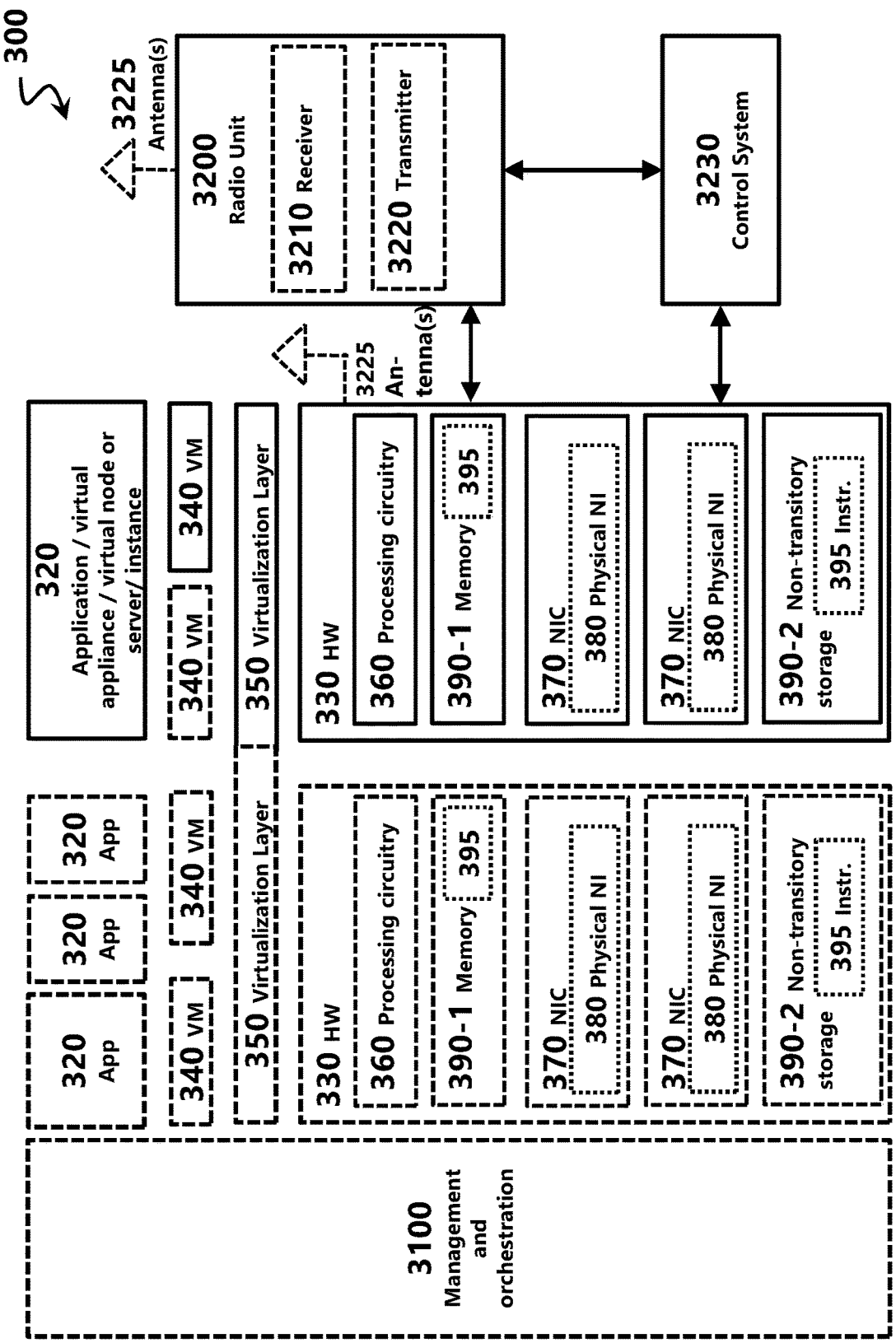
FIG. 7 illustrates an example of a virtualization environment in accordance with some embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g., such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 8:
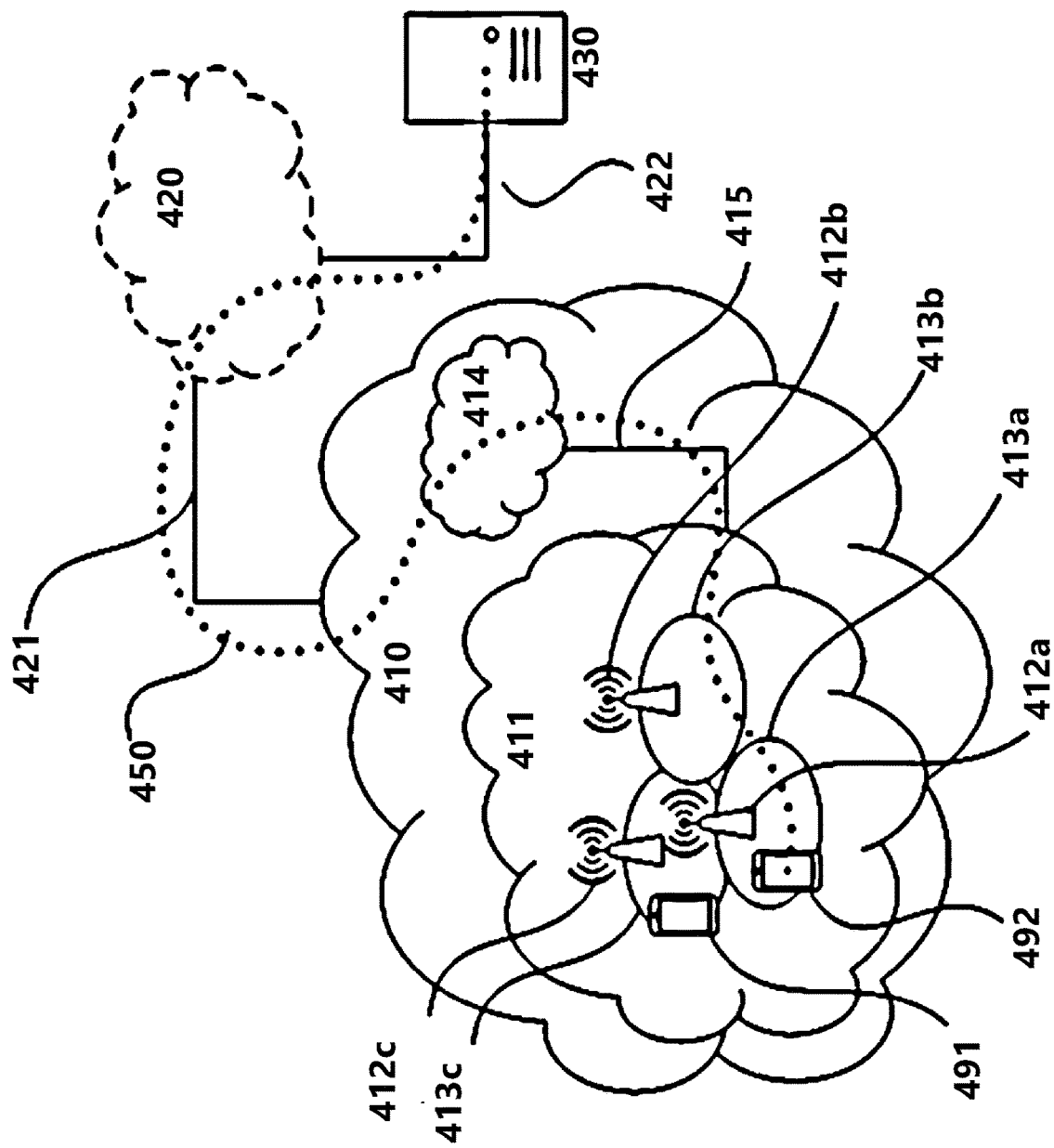
FIG. 8 illustrates an example of a telecommunication network connected via an intermediate network to a host computer in accordance with some embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412a, 412b, 412c, such as NBs, eNBs, gNBs or other types of wireless access points, each defining a corresponding coverage area 413a, 413b, 413c. Each base station 412a, 412b, 412c is connectable to core network 414 over a wired or wireless connection 415. A first UE 491 located in coverage area 413c is configured to wirelessly connect to, or be paged by, the corresponding base station 412c. A second UE 492 in coverage area 413a is wirelessly connectable to the corresponding base station 412a. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 9:
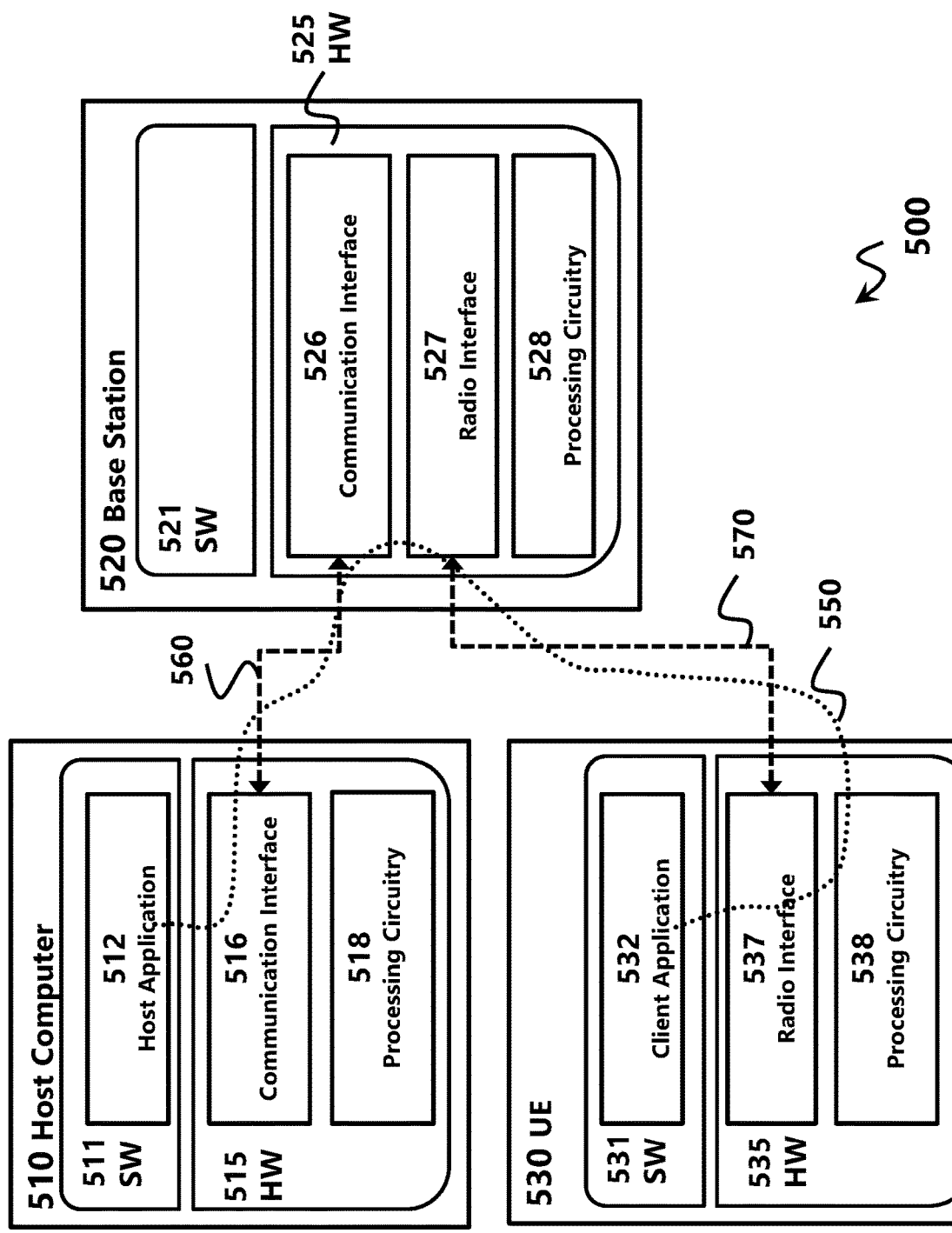
FIG. 9 illustrates an example of a host computer communicating via a base station with a user equipment over a partially wireless connection in accordance with some embodiments.

It is noted that host computer 510, base station 520 and UE 530 illustrated in FIG. 9 may be similar or identical to host computer 430, one of base stations 412a, 412b, 412c and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the speed and efficiency with which a UE may be able to connect to a NTN and thereby provide benefits such as improved battery life and quicker initial connections that improve the user experience allowing the user to begin accessing content and data sooner.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
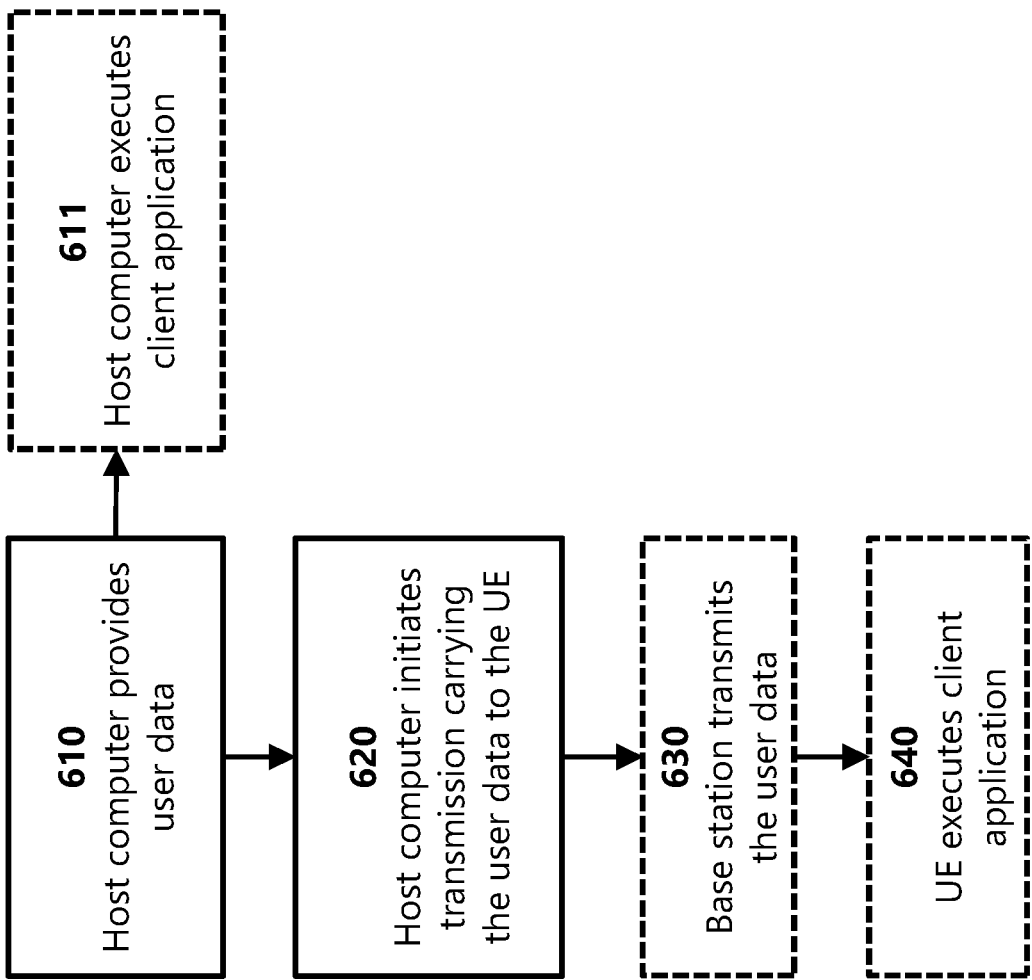
FIG. 10 illustrates an example of methods implemented in a communication system including a host computer, a base station and a user equipment in accordance with some embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
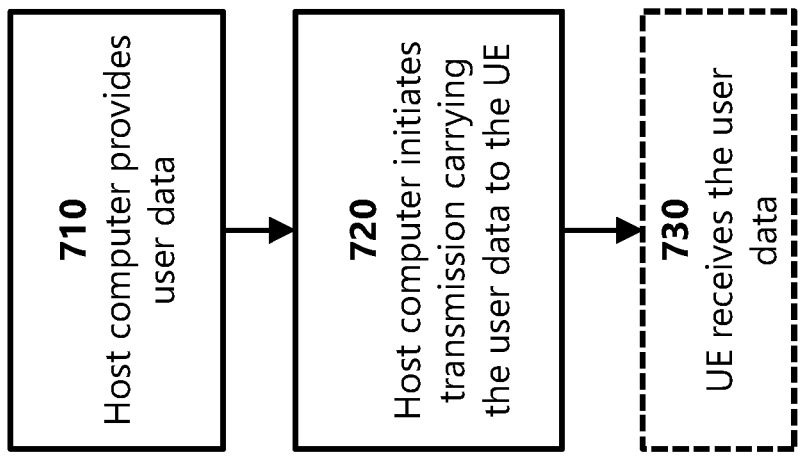
FIG. 11 illustrates an example of methods implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 12:
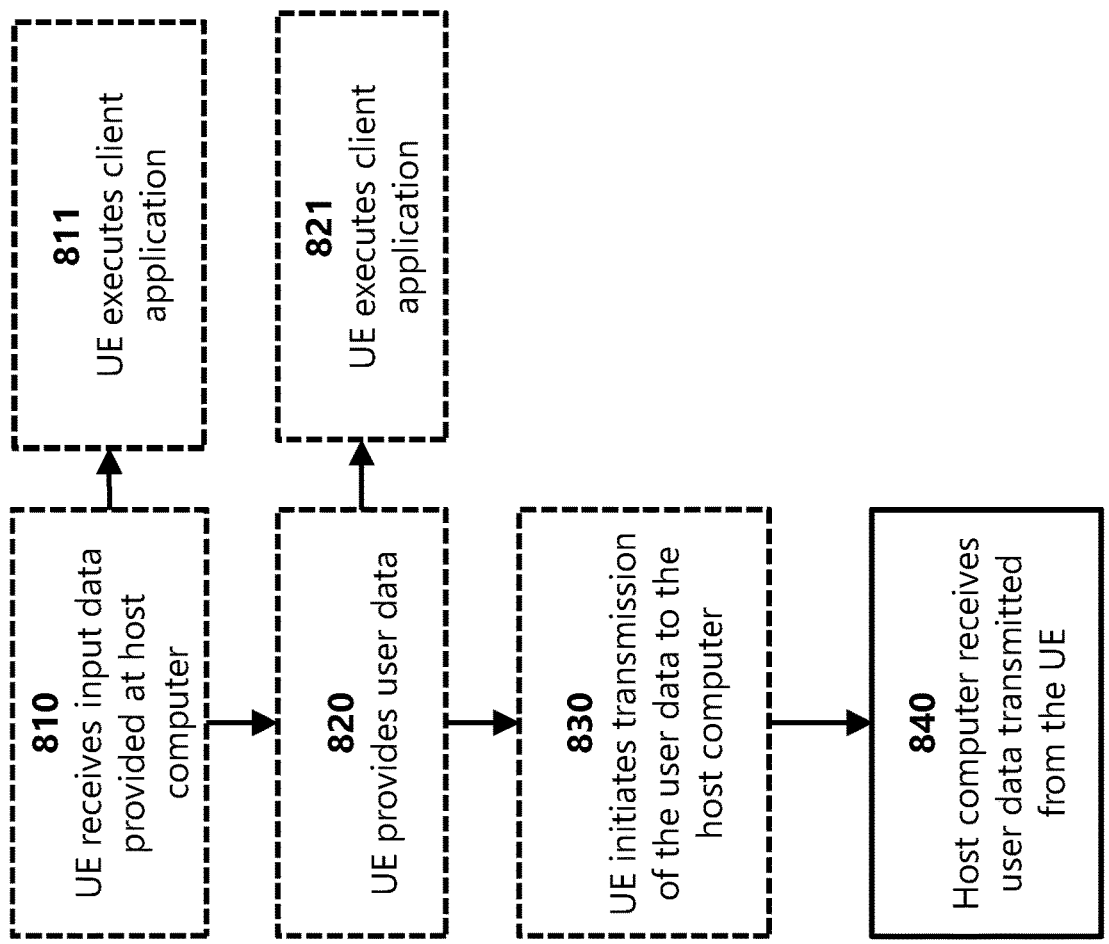
FIG. 12 illustrates an example of methods implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 13:
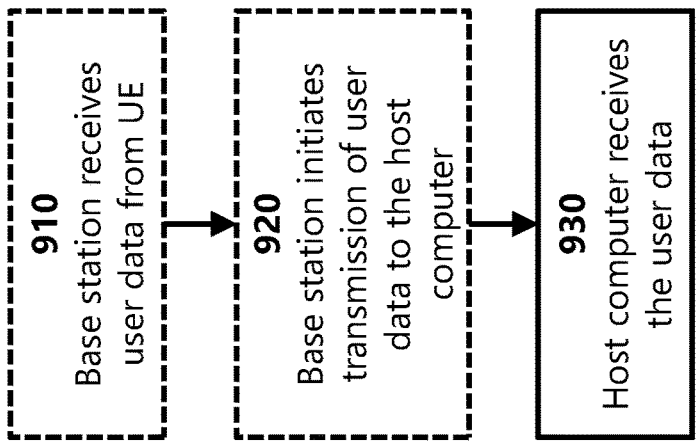
FIG. 13 illustrates an example of methods implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

EMBODIMENTS

Group A Embodiments

1. A method performed by a wireless device for connecting to a NTN, the method comprising:
   receiving A-GNSS information;
   receiving at least one signal from at least one GNSS satellite;
   determining a location of the wireless device using the A-GNSS information and information from the at least one signal from the at least one GNSS satellite;
   determining Doppler time and frequency offsets compared to a network satellite that the wireless device is to connect to; and
   initiating a connection process with the network satellite by transmitting a random access signal with pre-compensated time and frequency.

2. The method of 1 further comprising determining for how long the A-GNSS information is valid.

3. The method of 2 wherein the validity of the A-GNSS information is determined in part based on the mobility of the wireless device.

4. The method of any of 1-3 wherein the A-GNSS information is received in a system information message.

5. The method of any of 1-4 further comprising determining a location of network satellite.

6. The method of any of the previous embodiments, further comprising:

providing user data; and
forwarding the user data to a host computer via the transmission to the base station.

Group B Embodiments

7. A method performed by a base station for connecting to a wireless device, the method comprising:
determining a location of a coverage area of a network satellite;
identifying at least one GNSS satellite suitable for providing location information relevant to the coverage area of the network satellite;
determining A-GNSS data associated with the at least one GNSS satellite; and
transmitting the A-GNSS data to a wireless device.

8. The method of 7 wherein the coverage area of the network satellite is based on the location of the network satellite.

9. The method of any of 7-8 wherein the A-GNSS data is transmitted to the wireless device via a system information message.

10. The method of any of 7-9 wherein determining a coverage area of a network satellite comprises determining a location of the network satellite.

11. The method of any of 7-10 wherein the location of the coverage area and/or the network satellite comprises receiving satellite location data from another network node or by retrieving such data directly from the satellite.

12. The method of any of 7-11 wherein the location data comprises past location data and determining the location of the coverage area and/or the network satellite comprises estimating the location based on the past location data.

13. The method of any of 7-12 wherein the location data may be determined from orbital elements publicly available as TLE.

14. The method of any of 7-13 wherein identifying at least one suitable GNSS satellite comprises receiving GNSS satellite data from another network node or from the GNSS satellite system itself.

15. The method of 14 wherein past GNSS satellite data is used to predict the present or future location of one or more GNSS satellites.

16. The method of any of 7-15 wherein the A-GNSS data comprises data on a subset of GNSS satellites.

17. The method of any of 7-16 wherein the network node is part of the network satellite.

18. The method of any of 7-16 wherein the network node is located on the ground and is connected to the network satellite.

19. The method of any of 7-18 wherein the GNSS satellite subset is determined such that they may be used for positioning within the coverage area of the network satellite or for positioning within a future coverage area of the network satellite.

20. The method of any of 7-19 wherein the A-GNSS information comprises one or more of the following: (1) Almanac data for the subset of GNSS satellites; (2) Ephemeris data for the subset of GNSS satellites; (3) Timing information; (4) Ionospheric data, to account for ionospheric propagation effects.

21. The method of any of 7-20 wherein the A-GNSS data is further processed before transmission.

22. The method of 21 wherein further processing comprises quantizing, truncating or otherwise compressing in order to reduce the total transmitted amount of data.

23. The method of any of 7-22 wherein additional information is transmitted to the wireless device.

24. The method of 23 wherein the additional information includes one or more of: (1) information about the network satellite; (2) and indication for how long data is valid.

25. The method of 24 wherein the indication of how long the data is valid is based on how long until the UE would need to reacquire/update the A-GNSS information.

26. The method of any of 1-25 wherein the wireless device is only required to read the A-GNSS information on initial attach.

27. The method of any of 1-25 wherein the wireless device is only required to read the A-GNSS information if problems occur.

28. The method of any of the previous embodiments, further comprising:
obtaining user data; and
forwarding the user data to a host computer or a wireless device.

Group C Embodiments

29. A wireless device for connecting to a NTN, the wireless device comprising:
processing circuitry configured to perform any of the steps of any of the Group A embodiments; and
power supply circuitry configured to supply power to the wireless device.

30. A base station for connecting to a wireless device, the base station comprising:
processing circuitry configured to perform any of the steps of any of the Group B embodiments;
power supply circuitry configured to supply power to the base station.

31. A user equipment (UE) for connecting to a NTN, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

32. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.

33. The communication system of the previous embodiment further including the base station.

34. The communication system of the previous 2 embodiments, further including the UE, wherein the UE is configured to communicate with the base station.

35. The communication system of the previous 3 embodiments, wherein:
the processing circuitry of the host computer is configured to execute a host application, thereby providing the user data; and
the UE comprises processing circuitry configured to execute a client application associated with the host application.

36. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.

37. The method of the previous embodiment, further comprising, at the base station, transmitting the user data.

38. The method of the previous 2 embodiments, wherein the user data is provided at the host computer by executing a host application, the method further comprising, at the UE, executing a client application associated with the host application.

39. A user equipment (UE) configured to communicate with a base station, the UE comprising a radio interface and processing circuitry configured to performs the of the previous 3 embodiments.

40. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.

41. The communication system of the previous embodiment, wherein the cellular network further includes a base station configured to communicate with the UE.

42. The communication system of the previous 2 embodiments, wherein:
the processing circuitry of the host computer is configured to execute a host application, thereby providing the user data; and
the UE's processing circuitry is configured to execute a client application associated with the host application.

43. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.

44. The method of the previous embodiment, further comprising at the UE, receiving the user data from the base station.

45. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps of any of the Group A embodiments.

46. The communication system of the previous embodiment, further including the UE.

47. The communication system of the previous 2 embodiments, further including the base station, wherein the base station comprises a radio interface configured to communicate with the UE and a communication interface configured to forward to the host computer the user data carried by a transmission from the UE to the base station.

48. The communication system of the previous 3 embodiments, wherein:
the processing circuitry of the host computer is configured to execute a host application; and
the UE's processing circuitry is configured to execute a client application associated with the host application, thereby providing the user data.

49. The communication system of the previous 4 embodiments, wherein:
the processing circuitry of the host computer is configured to execute a host application, thereby providing request data; and
the UE's processing circuitry is configured to execute a client application associated with the host application, thereby providing the user data in response to the request data.

50. A method implemented in a communication system including a host computer, a base station and a user equipment (UE), the method comprising:
at the host computer, receiving user data transmitted to the base station from the UE, wherein the UE performs any of the steps of any of the Group A embodiments.

51. The method of the previous embodiment, further comprising, at the UE, providing the user data to the base station.

52. The method of the previous 2 embodiments, further comprising:
at the UE, executing a client application, thereby providing the user data to be transmitted; and
at the host computer, executing a host application associated with the client application.

53. The method of the previous 3 embodiments, further comprising:
at the UE, executing a client application; and
at the UE, receiving input data to the client application, the input data being provided at the host computer by executing a host application associated with the client application,
wherein the user data to be transmitted is provided by the client application in response to the input data.

54. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.

55. The communication system of the previous embodiment further including the base station.

56. The communication system of the previous 2 embodiments, further including the UE, wherein the UE is configured to communicate with the base station.

57. The communication system of the previous 3 embodiments, wherein:

the processing circuitry of the host computer is configured to execute a host application;

the UE is configured to execute a client application associated with the host application, thereby providing the user data to be received by the host computer.

58. A method implemented in a communication system including a host computer, a base station and a user equipment (UE), the method comprising:

at the host computer, receiving, from the base station, user data originating from a transmission which the base station has received from the UE, wherein the UE performs any of the steps of any of the Group A embodiments.

59. The method of the previous embodiment, further comprising at the base station, receiving the user data from the UE.

60. The method of the previous 2 embodiments, further comprising at the base station, initiating a transmission of the received user data to the host computer.

Figure 14:
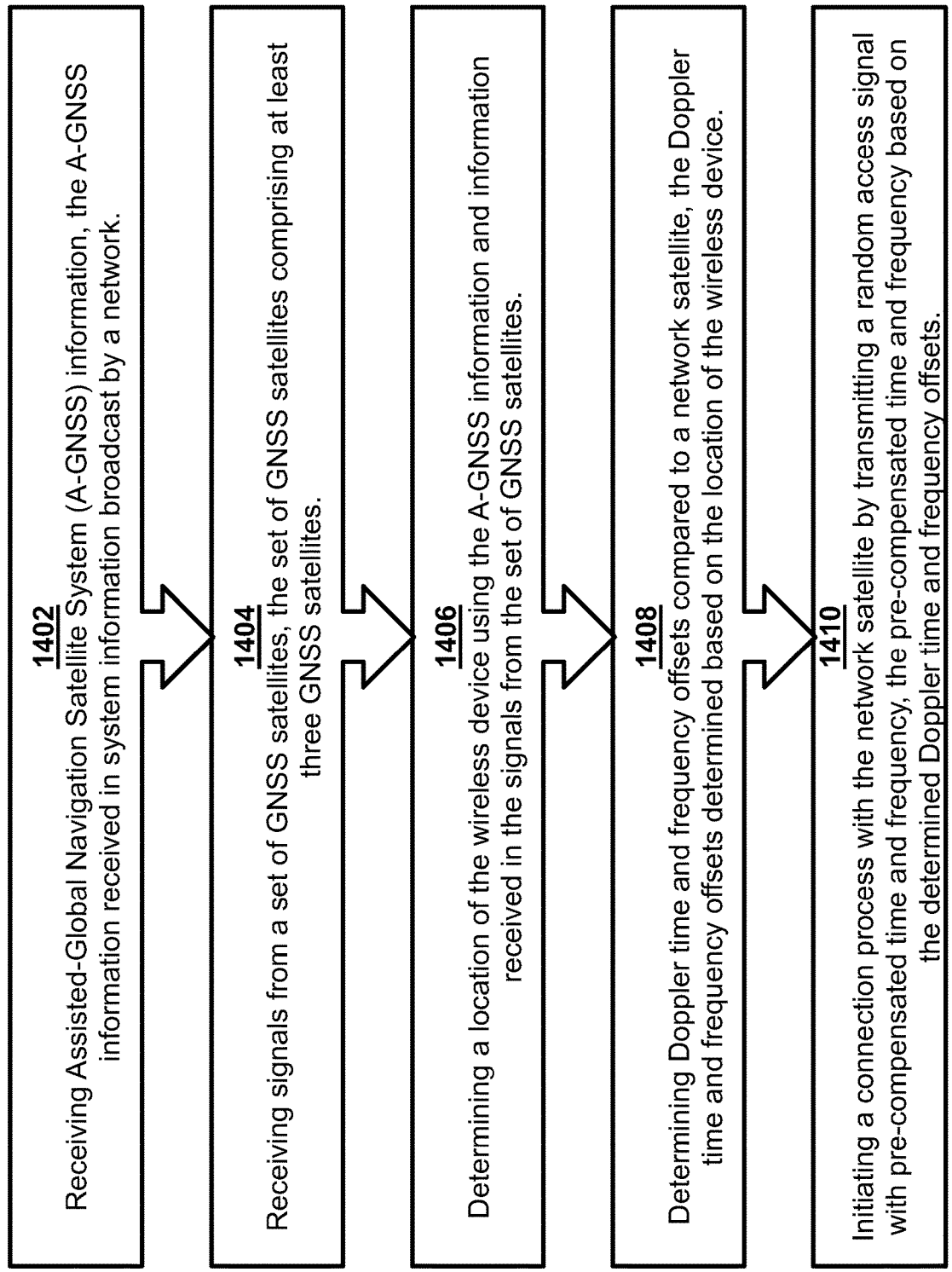
FIG. 14 illustrates an example of a method in a wireless device in accordance with some embodiments.

FIG. 14 illustrates an example of a method that may be performed by a wireless device, such as wireless device 110 (e.g., UE 200) described above. For example, wireless device 110 may comprise processing circuitry 120 (e.g., processor 201) configured to perform the steps of the method. The method begins at step 1402 with receiving system information broadcast by a network. The network may broadcast the system information via a terrestrial network node or a non-terrestrial network node. An example of a terrestrial network node includes a network node 160 that is located on the ground and connects to a network satellite 102, for example, via a gateway 103 and a feeder link. An example of a non-terrestrial network node includes a network node 160 that is part of network satellite 102.

The system information broadcast in step 1402 comprises A-GNSS information. Examples of A-GNSS information include almanac data for a set of GNSS satellites, ephemeris data for the set of GNSS satellites, timing information, and/or ionospheric data that accounts for ionospheric propagation effects. The wireless device may be configured such that it is required to read the A-GNSS information on initial attach and/or in response to a problem (e.g., radio link failure or problem completing random access). In some embodiments, the system information indicates when the wireless device is required to read the A-GNSS information.

The method proceeds to step 1404 with receiving signals from a set of GNSS satellites. The set of GNSS satellites may comprise at least three GNSS satellites, such as GNSS satellite 104A, GNSS satellite 104B, and a third GNSS satellite 104. Including at least three GNSS satellites in the set may facilitate triangulating a location of the wireless device.

Certain embodiments determine one or more GNSS satellites suitable to include in the set of GNSS satellites based on an ability to use a given GNSS satellite for positioning within a present coverage area or a future coverage area of a network satellite. An example of a network satellite includes network satellite 102 of the radio access network with which the wireless device may initiate a connection process in step 1410, discussed below. Certain embodiments estimate the present or future coverage area of the network satellite (or the present or future location of the network satellite). As an example, certain embodiments estimate the present or future coverage area of the network satellite (or the present or future location of the network satellite) based on past location data associated with the network satellite. The past location data can be received from the network satellite or another network node. As another example, certain embodiments estimate the present or future coverage area of the network satellite (or the present or future location of the network satellite) based on location data that is associated with the network satellite and is determined from orbital elements publicly available as TLE.

Certain embodiments determine one or more GNSS satellites suitable to include in the set of GNSS satellites based on GNSS satellite data associated with a given GNSS satellite. The GNSS satellite data may be received from the GNSS (e.g., via any suitable GNSS satellite of the GNSS system itself) or from another network node. In certain embodiments, the GNSS satellite data comprises past GNSS satellite data used to predict a present or future location of a given GNSS satellite being considered for inclusion in the set of GNSS satellites from which signals are received in step 1404. Certain embodiments compare the predicted present or future location of a given GNSS satellite to the estimated present or future coverage area of the network satellite, determine whether the given GNSS satellite is suitable for positioning within the estimated present or future coverage area of the network satellite, and include the given GNSS satellite in the set of GNSS satellites based at least in part on the given GNSS satellite being suitable for positioning within the estimated present or future coverage area of the network satellite.

The method proceeds to step 1406 with determining a location of the wireless device using the A-GNSS information received in step 1402 and information received in the signals from the set of GNSS satellites in step 1404. Certain embodiments determine how long the A-GNSS information is valid and use the A-GNSS information while the A-GNSS information. As an example, determining how long the A-GNSS information is valid can be based at least in part on receiving an indication how long the A-GNSS information is valid from the network. As another example, determining how long the A-GNSS information is valid can be based at least in part on how long until the wireless device needs to reacquire or update the A-GNSS information. As another example, determining how long the A-GNSS information is valid can be based at least in part on mobility of the wireless device.

The method proceeds to step 1408 with determining Doppler time and frequency offsets compared to the network satellite. The Doppler time and frequency offsets are determined based on the location of the wireless device (the location that was determined in step 1406). The Doppler time and frequency offsets compared to the network satellite depend in part on the current location of the second network satellite. Thus, in order for the wireless device to determine the Doppler and frequency shift in step 1408, the wireless device may first determine the current location of the network satellite. For example, the wireless device may determine the current location of the network satellite from the SI message or from predicting the current location of the network satellite based on knowledge of a previous location of the network satellite (e.g., possibly by using additional data, such as ephemeris data). The method continues to step 1410 with initiating a connection process with the network satellite. The connection process comprises transmitting a random access signal with pre-compensated time and frequency. The pre-compensated time and frequency are based on the Doppler time and frequency offsets determined in step 1408. Examples of the random access signal transmitted in step 1410 may include any suitable signal associated with a random access procedure, such as a random access preamble, a signal initializing a random access procedure, etc.

As described above, in the method of FIG. 14, the wireless device obtains the A-GNSS information in system information broadcast by the network (without having to first connect to a satellite in order to obtain the A-GNSS information). The A-GNSS information assists the wireless device in efficiently receiving the signals from the set of GNSS satellites and determining the location of the wireless device, which in turn assists the wireless device in determining Doppler time and frequency offsets so that the wireless device may initiate a connection process to a network satellite without undue delay.

Additional description of steps that may be performed by the wireless device are provided above, for example, under the heading "Device connection to a cellular satellite network by network provided A-GNSS information." Additionally, the wireless device may be configured to perform functionality analogous/reciprocal to that of a network node. For example, the wireless device may be configured to receive and use information described as being provided by a network node under the headings "Cellular satellite network provision of Assisted-GNSS information" and/or "Determination of GNSS satellites to include in A-GNSS information" above or with respect to FIG. 2 or FIG. 15.

Figure 15:
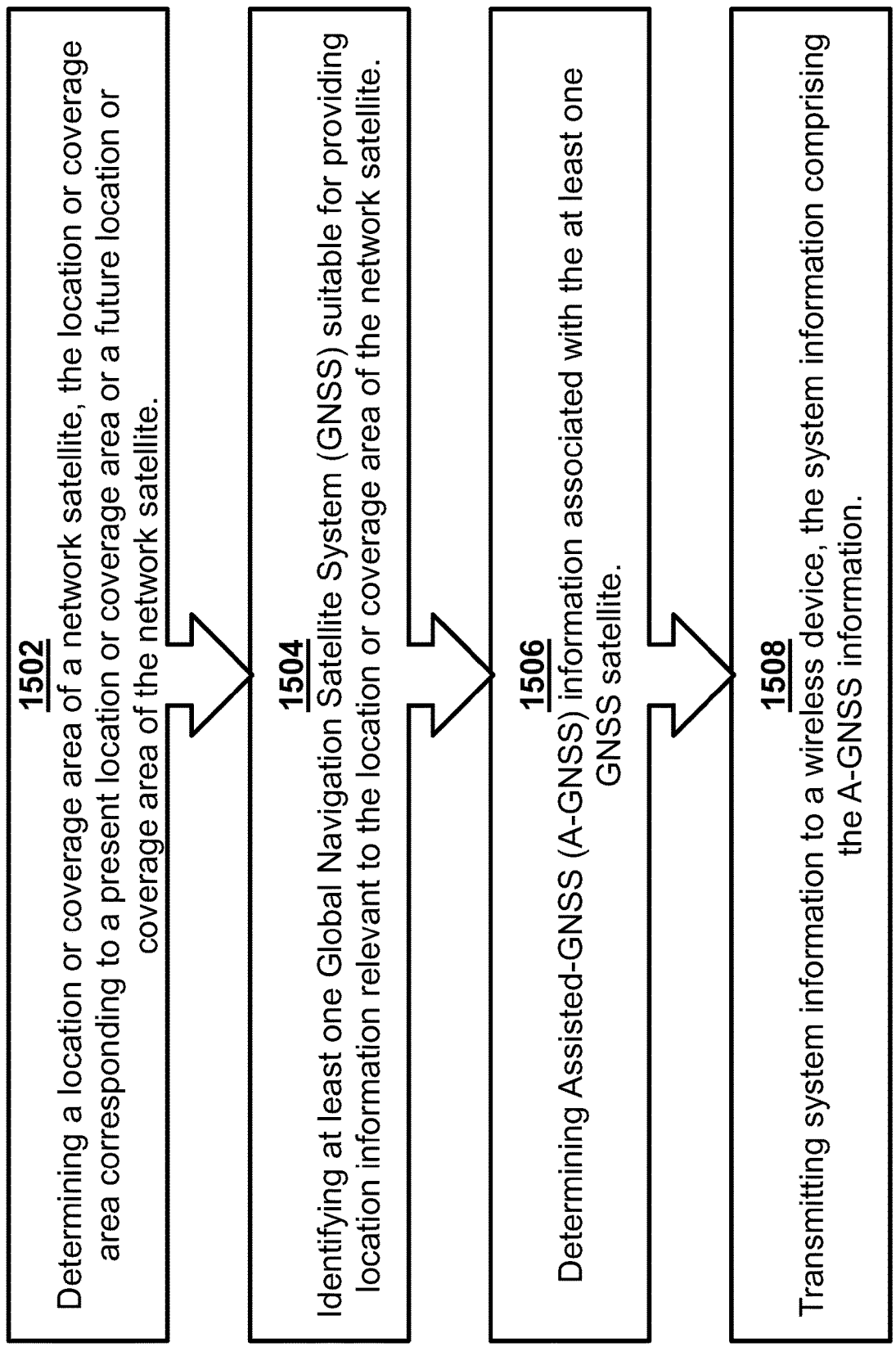
FIG. 15 illustrates an example of a method in a network node in accordance with some embodiments.

FIG. 15 illustrates an example of a method that may be performed by a network node, such as network node 160 described above. For example, network node 160 may comprise processing circuitry 170 configured to perform the steps of the method. In certain embodiments, the network node is part of a network satellite (e.g., network satellite 102 of a radio access network). In other embodiments, the network node is located on the ground and is connected to the network satellite (e.g., via gateway 103 and a feeder link).

The method begins at step 1502 with determining a location or coverage area of a network satellite (e.g., network satellite 102 of the radio access network). The location corresponds to a present or future location of the network satellite/the coverage area corresponds to a present or future coverage area of the network satellite. Certain embodiments estimate the location or coverage area of the network satellite based on past location data associated with the network satellite. The past location data can be obtained from the network satellite or another network node. Certain embodiments estimate the location or coverage area of the network satellite based on location data that is determined from orbital elements publicly available as a TLE and that is associated with the network satellite.

The method proceeds to step 1504 with identifying at least one GNSS satellite (e.g., GNSS satellite 104) suitable for providing location information relevant to the location or coverage area of the network satellite. Certain embodiments identify the at least one GNSS satellite based on GNSS satellite data associated with the at least one suitable GNSS satellite. The GNSS satellite data may be received from the GNSS or another network node. As an example, the GNSS satellite data can include past GNSS satellite data used to predict a present or future location of the at least one GNSS satellite. By predicting the present or future location of the least one GNSS satellite, the method can determine the proximity of the at least one GNSS satellite to the present or future location (or present or future coverage area) of the network satellite in order to determine whether the at least one GNSS satellite is suitable for providing location information relevant to the present or future location or coverage area of the network satellite.

The method proceeds to step 1506 with determining A-GNSS information associated with the at least one GNSS satellite. The method may determine the A-GNSS information in any suitable manner, such as downloading the A-GNSS information from an A-GNSS server or retrieving stored A-GNSS information. Examples of A-GNSS information include almanac data for the set of GNSS satellites, ephemeris data for the set of GNSS satellites, timing information, and/or ionospheric data that accounts for ionospheric propagation effects.

The method continues to step 1508 with transmitting system information to a wireless device. For example, the system information may be broadcast such that wireless devices within a coverage area of the network node receive the system information. The system information comprises the A-GNSS information determined in step 1506. Prior to transmitting the A-GNSS information, certain embodiments process the A-GNSS information in order to reduce a total amount of transmitted data. Processing may comprise quantizing, truncating, or otherwise compressing the A-GNSS information in order to reduce the total transmitted amount of data.

In certain embodiments, the system information transmitted in step 1508 further indicates when the wireless device is required to read the A-GNSS information. As an example, the system information may indicate whether the wireless device is required to read the A-GNSS information on initial attach. As another example, the system information may indicate whether the wireless device is required to read the A-GNSS information in response to a problem (e.g., radio link failure or problem completing random access).

In certain embodiments, the method also transmits information to the wireless device indicating for how long the A-GNSS information is valid. The method may determine how long the A-GNSS information is valid, for example, based at least in part on how long until the wireless device needs to reacquire or update the A-GNSS information, or based at least in part on mobility of the wireless device.

Additional description of steps that may be performed by the network node are provided above, for example, under the headings "Cellular satellite network provision of Assisted-GNSS information" and/or "Determination of GNSS satellites to include in A-GNSS information." Additionally, the network node may be configured to perform functionality analogous/reciprocal to that of a wireless device. For example, the network node may be configured to provide the wireless device with information described as being received by the wireless device under the heading "Device connection to a cellular satellite network by network provided A-GNSS information" above or with respect to FIG. 4 or FIG. 14.

Figure 16:
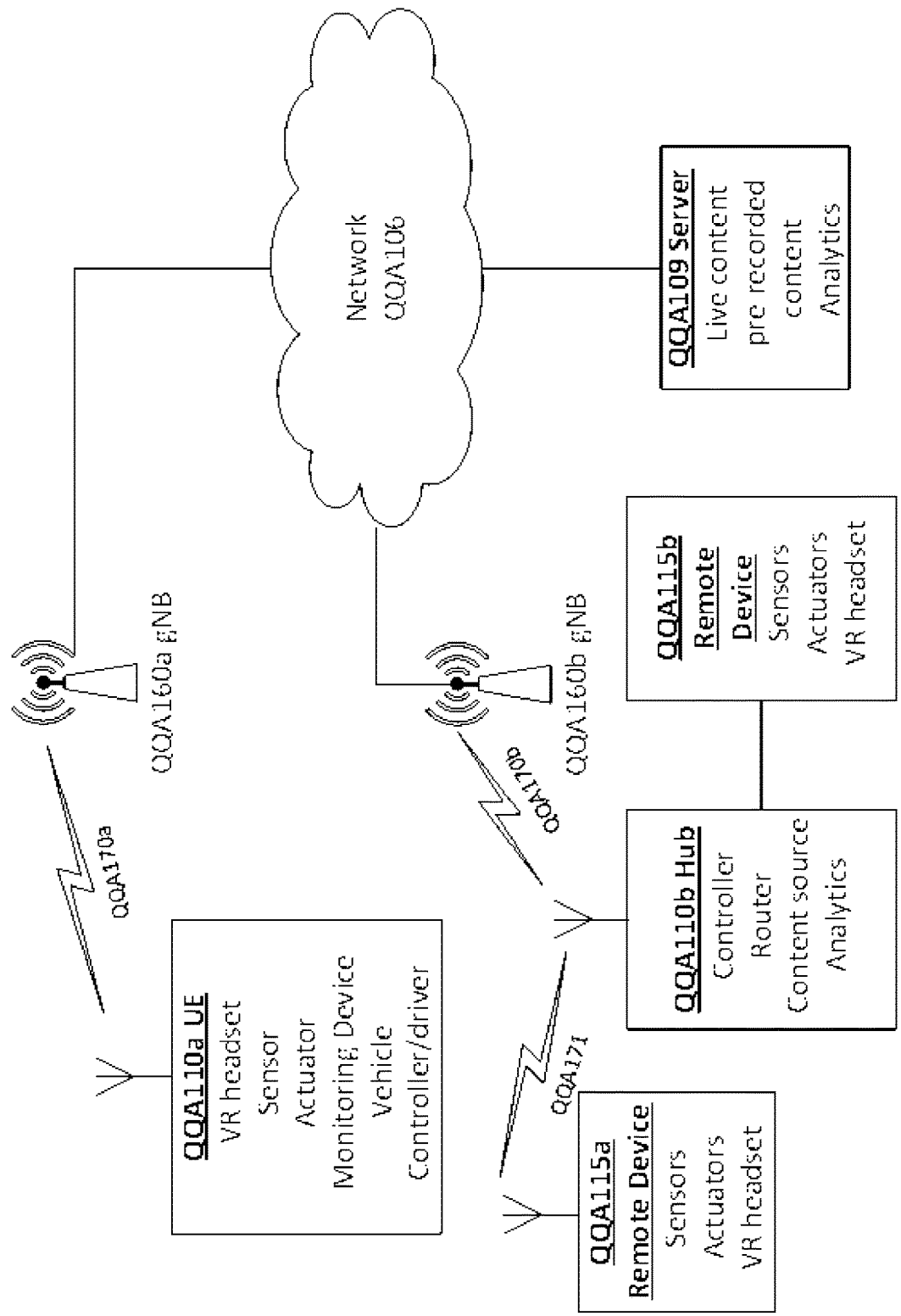
FIG. 16 illustrates an example of a wireless network in accordance with some embodiments.

FIG. 16 depicts a wireless network comprising different devices connected, either directly or indirectly, to the wireless network through one or more access network nodes, such as gNBs QQA160a and QQA160b. In particular, the wireless network includes access network nodes such as gNBs QQA160a and QQA160b, UE QQA110a, hub QQA110b, remote devices QQA115a and QQA115b and server QQA109. UE QQA110a and hub QQA110b may be any of a wide variety of devices capable of communicating wirelessly with gNBs QQA160's. Although hub QQA110b is referred to as a hub, it may also be considered a UE (with hub functionality) because it is able to communicate wirelessly with gNB QQA160b using a standard protocol, for example a wireless standard such as one provided by 3GPP. In fact, each of the devices illustrated in Figure QQA represent a wide variety of different devices that can be used in different scenarios as discussed in more detail below. Any of these devices which are able to communicate wirelessly with a gNB, eNB or any other similar 3GPP access node may be considered a wireless device or UE.

Looking now at some of the possibilities, UE QQA110*a* may be any of a variety of different devices that are able to wirelessly communicate with gNB QQA160*a*. Some examples, which are listed in Figure QQA, include a virtual reality (VR) headset, a sensor, an actuator, a monitoring device, a vehicle, or a remote controller. These examples are not exhaustive and include therein a wide variety of more specific devices, including a wide range of Internet of Things (IoT) devices. For example, in embodiments where UE QQA110*a* is a VR headset, UE QQA110*a* may be a cell phone that is used with a head mount or it may be a standalone or dedicated VR headset. In some embodiments UE QQA110*a* may be an augmented reality (AR) headset. As an AR or VR headset UE QQA110*a* may be used for entertainment (e.g., gaming, videos, etc.), education/business (e.g., remote conferences, virtual lectures, etc.), medical (e.g., remote diagnostic, patient consultation, etc.), or any other use in which virtual or augmented content may be provided to a remote user. In any of these cases UE QQA110*a* may be receiving content via wireless connection QQA170*a* with gNB QQA160*a*.

As another example, in embodiments where UE QQA110*a* is a sensor or monitoring device, UE QQA110*a* may be a motion, gravitational, moisture, temperature, biometric, speed, door/window open, smoke, fire, volume, flow, or any other type of device that is able to detect or measure one or more conditions. As a sensor UE QQA110*a* may also be able to capture conditions. For example, UE QQA110*a* may capture images if it comprises a camera or sound if it comprises a microphone. Regardless of the type of sensor, UE QQA110*a* may provide an output via wireless connection QQA170*a* to gNB QQA160*a*. The output may be periodic (e.g., once every 15 minutes if it reports the sensed temperature), random (e.g., to even out the load from reporting from several sensors), in response to a triggering event (e.g., when moisture is detected an alert is sent), in response to a request (e.g., a user initiated request), or a continuous stream (e.g., a live video feed of a patient).

As another example, in embodiments where UE QQA110*a* is an actuator, UE QQA110*a* may be a motor, switch, or any other device that may change states in response to receiving an input via wireless connection QQA170*a*. For example, UE QQA100*a* may be a vibrator that creates vibration to provide a user with haptic feedback. As another example UE QQA100*a* may be a small motor that adjusts the control surfaces of a drone in flight or to a robotic arm performing a medical procedure. As another example, UE QQA100*a* may be a switch that remotely turns on another device, such as a light.

As another example, in embodiments where UE QQA110*a* is a vehicle, UE QQA110*a* may be a drone, car, plane, ship, train, tractor, robot, or any other type of device comprising one or more sensors and/or actuators that may change its locations whether autonomously or at the direction of a user. In such embodiments where UE QQA110*a* is a remotely controlled vehicle, such as a drone, it may receive instructions on movement, actuating, or sensing from a user via wireless connection QQA170*a* and provide location, sensor or video information back to the user via wireless connection QQA170*a*. In such embodiments where UE QQA110*a* is an autonomous vehicle it may receive alerts and other messages from other vehicles and/or infrastructure sensors via wireless connection QQA170*a* as well provide its own telemetry data to others via wireless connection QQA170*a*.

As another example, in embodiments where UE QQA110*a* is a remote control, UE QQA110*a* may be a device dedicated to controlling other devices or a general purpose computer with a program or application that provides control of other devices. UE QQA110*a* may send commands to a remote device via wireless connection QQA170*a*. UE QQA110*a* may also receive feedback, telemetry, or other information from the remote device via wireless connection QQA170*a*. UE QQA110*a* may present this received information to a user who may then issue commands for the remote device. For example, UE QQA110*a* may receive via wireless connection QQA170*a* a video signal from a remote surgical room and then issue commands via wireless connection QQA170*a* to a remote surgical machine that can execute the commands.

While only a single UE QQA110*a* is illustrated in Figure QQA, in practice any number of UEs may be used together with respect to a single use case. For example, a first UE QQA110*a* may be a speed sensor used in a drone which provides the drone's speed information to a second UE QQA110*a* that is a remote control operating the drone. When the user makes changes from the remote control, a third UE QQA110*a* that is an actuator may adjust a throttle on the drone to increase or decrease the speed. Similarly, in the example above, the first (sensor) and third (actuator) UE QQA110*a*'s may be a single UE that handles communication for both the speed sensor and the actuators or UE QQA110*a* may comprise one or more of the above. Similarly, in the example above, a hub, such as hub QQA110*b*, may be used to handle communication between the sensors and actuators and the controller.

Hub QQA110*b* may be any of a variety of different devices that provides wireless access to gNB QQA160*b* for one or more remote devices QQA115*a*. Some examples of different types of hubs are listed in Figure QAA and include a controller, router, content source and analytics. Hub QQA110*b* may include memory to store data (e.g., video, audio, images, buffer, sensor data, file share) that is collected from, or is to be provided to, remote device QQA115*a*. Hub QQA110*b* hub may include a processor, operating system, and server functionality. Hub QQA110*b* may include components for wireless communication to enable wireless connection QQA171 to remote device QQA115*a* and/or components for a fixed connection to remote device QQA115*b*. Hub QQA110*b* may also include routing capabilities, firewall capabilities, a VPN-server or VPN-client. Hub QQA110*b* may also allow for a different communication scheme and/or schedule between hub QQA110*b* and remote devices QQA115 and between hub QQA110*b* and network QQA106.

As one example, hub QQA110*b* may be a broadband router enabling direct or indirect access to network QQA106 for remote device QQA115*a*. In certain embodiments, hub QQA110*b* may facilitate communication between remote devices QQA115*a* and QQA115*b*. This may be done with, or without, the communications passing through network QQA106. In some embodiments, hub QQA110*b* may simply forward the data from remote device QQA115*a* or QQA115*b* to network QQA106. In some embodiments, hub QQA110*b* may first filter, buffer, store, analyze or collate the data from remote device QQA115*a* or QQA115*b* before sending on the data to network QQA106 or another remote device. Similarly, the data from network QQA106 may pass directly through hub QQA110*b* or it may first be processed by hub QQA110*b* on the way to remote device QQA115*a* or QQA115*b*.

As another example, hub QQA110b may be a controller that sends commands or instructions to one or more actuators in remote device QQA115a. The commands or instructions may be received from a second remote device QQA115b, from gNB QQA160b or by executable code, script or process instructions in hub QQA110b.

As another example, hub QQA110b may be a collection place for data from one or more remote devices QQA115a and/or QQA115b. For example, remote devices QQA115a and/or QQA115b may be a sensor, a camera, measurement equipment, or any other type of device discussed herein that may provide output or receive input. Hub QQA110b may act as a temporary storage for data from, for example remote device QQA115b and, in some embodiments, may perform analysis, or other processing on the data. Hub QQA110b may have a constant/persistent or intermittent connection to gNB QQA160b.

As another example, hub QQA110b may be a content source. For example, when remote device QQA115a is a VR headset, display, loudspeaker or other media delivery device, hub QQA110b may retrieve VR assets, video, audio, or other media via gNB QQA160b which it then provides to remote device QQA115a either directly, after some local processing, and/or after adding additional local content.

Remote device QQA115a may be any of a variety of different devices, for example, remote device QQA115a may be a device comprising one or more of sensors, actuators, and/or a screen. Remote device QQA115a may alternatively be a VR (or AR) headset, a Machine-2-Machine (M2M) device, an IoT device, an Internet of Everything (IoE) device, or any other type of device which is capable of accessing a communication network wirelessly via a hub or a device capable of acting as a hub, which in the present context comprise providing network access to a device which is not able to communicate directly with communication network QQA106 via gNB QQA160a or QQA160b. In some scenarios, remote device QQA115a may be able to establish a wireless connection with gNB QQA160a or QQA160b yet nonetheless still connects via hub QQA 110b. Remote device QQA115b may be similar to remote device QQA115a in most respects except that it has a wired connection to hub QQA110b rather than a wireless connection, such as wireless connection QQA171.

gNBs QQA160a and QQA160b may provide various wireless devices such as UE QQA110a and hub QQA110b with wireless access to network QQA106. Network QQA106 may connect the various devices illustrated in Figure QQA including server QQA109 which may host a variety of applications such as live and pre-recorded content, data collection services such as retrieving and compiling data on various ambient conditions detected by a plurality of remote devices QQA115a, QQA115b or UE QQA110a, analytics functionality, social media, functions for controlling or otherwise interacting with remote devices, functions for an alarm and surveillance center, or any other such function done by a server. For example, factory status information may be collected and analyzed by server QQA109. As another example, server QQA109 may process audio and video data which may have been retrieved from UE QQA110a for use in creating maps. As another example, server QQA109 may collect and analyze real-time data to assist in controlling vehicle congestion (e.g., controlling traffic lights). As another example, server QQA109 may store surveillance video uploaded by remote device QQA115b via hub QQA110b. As another example, server QQA109 may store media content such as video, audio, VR, or AR which it can broadcast, multicast or unicast to remote devices such as UE QQA110a or remote device QQA115a. As other examples, server QQA109 may be used for energy pricing, for remote control of non-time critical electrical load to balance power generation needs, location services, presentation services (such as compiling diagrams etc. from data collected from remote devices), or any other function of collecting, retrieving, storing, analyzing and/or transmitting data.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set. As used in this document, "based on" means "based at least in part on" unless a different meaning is clearly given and/or is implied from the context in which it is used.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the following claims.

The invention claimed is:

1. A method performed by a wireless device, the method comprising:

receiving Assisted-Global Navigation Satellite System (A-GNSS) information, the A-GNSS information received in system information broadcast by a network via a Third Generation Partnership Project (3GPP) wireless signal;

receiving signals from a set of GNSS satellites, the set of GNSS satellites comprising at least three GNSS satellites;

determining how long the A-GNSS information is valid;

determining a location of the wireless device using the A-GNSS information and information received in the signals from the set of GNSS satellites, wherein the A-GNSS information is used while the A-GNSS information is valid;

determining Doppler time and frequency offsets compared to a network satellite, the Doppler time and frequency offsets determined based on the location of the wireless device; and initiating a connection process with the network satellite by transmitting a random access signal with pre-compensated time and frequency, the pre-compensated time and frequency based on the determined Doppler time and frequency offsets.

2. The method of claim 1, further comprising:
determining at least one GNSS satellite suitable to include in the set of GNSS satellites, the determining based on an ability to use the at least one GNSS satellite for positioning within a present coverage area or a future coverage area of the network satellite.

3. The method of claim 1, further comprising:
determining at least one GNSS satellite suitable to include in the set of GNSS satellites, the determining based on GNSS satellite data associated with the at least one GNSS satellite, wherein the GNSS satellite data is received from the GNSS or another network node.

4. The method of claim 1, further comprising:
estimating a location or coverage area of the network satellite based on past location data associated with the network satellite, the past location data received from the network satellite or another network node.

5. The method of claim 1, further comprising:
estimating a location or coverage area of the network satellite based on location data associated with the network satellite, the location data determined from orbital elements publicly available as a two-line element set (TLE).

6. The method of claim 1, wherein the wireless device is required to read the A-GNSS information on initial attach.

7. The method of claim 1, wherein the wireless device is required to read the A-GNSS information in response to a radio link failure or in response to a problem completing random access.

8. A wireless device, the wireless device comprising:
power supply circuitry configured to supply power to the wireless device; and
processing circuitry configured to:
receive Assisted-Global Navigation Satellite System (A-GNSS) information, the A-GNSS information received in system information broadcast by a network via a Third Generation Partnership Project (3GPP) wireless signal;

receive signals from a set of GNSS satellites, the set of GNSS satellites comprising at least three GNSS satellites;

determine how long the A-GNSS information is valid;

determine a location of the wireless device using the A-GNSS information and information received in the signals from the set of GNSS satellites, wherein the A-GNSS information is used while the A-GNSS information is valid;

determine Doppler time and frequency offsets compared to a network satellite, the Doppler time and frequency offsets determined based on the location of the wireless device; and initiate a connection process with the network satellite by transmitting a random access signal with pre-compensated time and frequency, the pre-compensated time and frequency based on the determined Doppler time and frequency offsets.

9. The wireless device of claim 8, the processing circuitry further configured to:
determine at least one GNSS satellite suitable to include in the set of GNSS satellites based on an ability to use the at least one GNSS satellite for positioning within a present coverage area or a future coverage area of the network satellite.

10. The wireless device of claim 8, the processing circuitry further configured to:
determine at least one GNSS satellite suitable to include in the set of GNSS satellites based on GNSS satellite data associated with the at least one GNSS satellite, wherein the GNSS satellite data is received from the GNSS or another network node.

11. The wireless device of claim 8, the processing circuitry further configured to:
estimate a location or coverage area of the network satellite based on past location data associated with the network satellite, the past location data received from the network satellite or another network node.

12. The wireless device of claim 8, the processing circuitry further configured to:
estimate a location or coverage area of the network satellite based on location data associated with the network satellite, the location data determined from orbital elements publicly available as a two-line element set (TLE).

13. The wireless device of claim 8, wherein the wireless device is required to read the A-GNSS information on initial attach.

14. The wireless device of claim 8, wherein the wireless device is required to read the A-GNSS information in response to a radio link failure or in response to a problem completing random access.

* * * * *